(12) United States Patent
Tsutsumi

(10) Patent No.: US 9,503,633 B2
(45) Date of Patent: Nov. 22, 2016

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Shohei Tsutsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 14/155,463

(22) Filed: Jan. 15, 2014

(65) Prior Publication Data

US 2014/0198230 A1    Jul. 17, 2014

(30) Foreign Application Priority Data

Jan. 15, 2013   (JP) ................................. 2013-004990
Dec. 25, 2013   (JP) ................................. 2013-267102

(51) Int. Cl.
*H04N 5/232* (2006.01)
*H04N 5/225* (2006.01)

(52) U.S. Cl.
CPC ........ *H04N 5/23222* (2013.01); *H04N 5/2258* (2013.01); *H04N 5/23212* (2013.01);
(Continued)

(58) Field of Classification Search
CPC .............. H04N 5/2258; H04N 5/23222; H04N 5/23212; H04N 5/23293; H04N 5/23219; H04N 5/247; H04N 2013/0088; H04N 13/00–13/0296; H04N 5/23229–5/23232; G02B 3/0006; G02B 3/0037–3/0075; G02B 3/005; G02B 3/0056; G06T 5/003; G06T 2207/20212–2207/20224
See application file for complete search history.

(56) References Cited

U.S. PATENT DOCUMENTS

2007/0279516 A1* 12/2007 Ishii .............................. 348/345
2008/0131019 A1   6/2008 Ng
(Continued)

FOREIGN PATENT DOCUMENTS

JP      2008050904 A1    3/2008
JP      2009124213 A     6/2009

OTHER PUBLICATIONS

Ng, "Fourier Slice Photography", ACM Trans. Graph. 24, 2005, pp. 735 to 744.

*Primary Examiner* — Paul Berardesca
(74) *Attorney, Agent, or Firm* — Carter, DeLuca, Farrell & Schmidt, LLP

(57) ABSTRACT

By conventional method, it is not possible to check whether or not a target subject is included in a range in which refocus can be performed at the time of image capturing or at the time of editing a captured image. An image processing apparatus includes a subject of interest specification unit configured to specify a subject of interest within a parallax image obtained by performing image capturing from a plurality of different viewpoints, and a notification unit configured to notify a user of a focused state of the specified subject of interest in an image to be generated by performing image combination processing using the parallax image.

22 Claims, 31 Drawing Sheets

(52) U.S. Cl.
CPC ...... *H04N 5/23219* (2013.01); *H04N 5/23229* (2013.01); *H04N 5/23293* (2013.01)

(56) References Cited

U.S. PATENT DOCUMENTS

| | | | |
|---|---|---|---|
| 2010/0129048 A1* | 5/2010 | Pitts | H04N 5/23212 386/278 |
| 2011/0164166 A1* | 7/2011 | Oikawa | 348/340 |
| 2011/0249961 A1* | 10/2011 | Brunner | 396/213 |
| 2014/0071305 A1* | 3/2014 | Hiasa et al. | 348/218.1 |
| 2014/0253760 A1* | 9/2014 | Watanabe | H04N 5/142 348/239 |
| 2015/0055010 A1* | 2/2015 | Eguchi | G03B 13/36 348/349 |

* cited by examiner

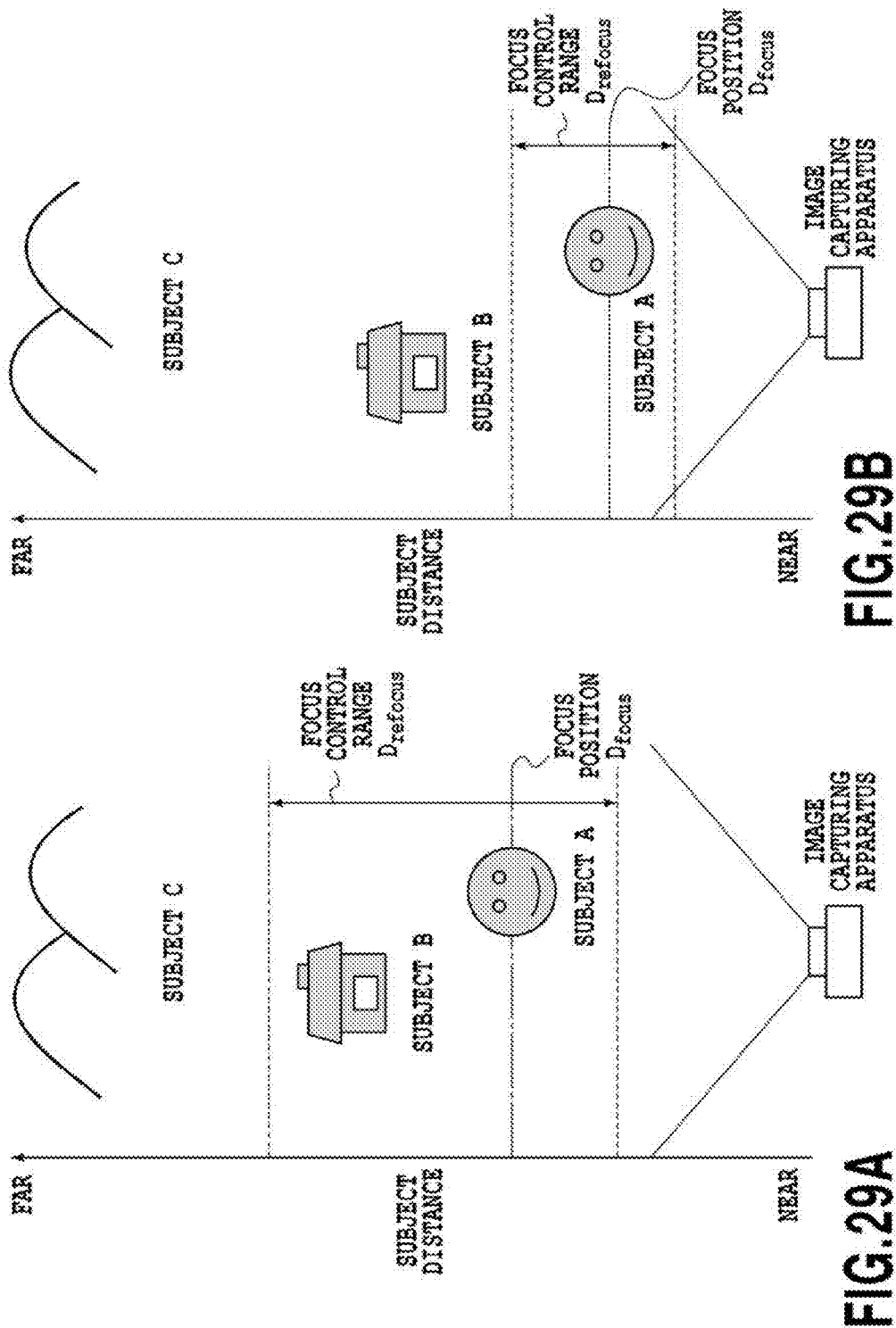

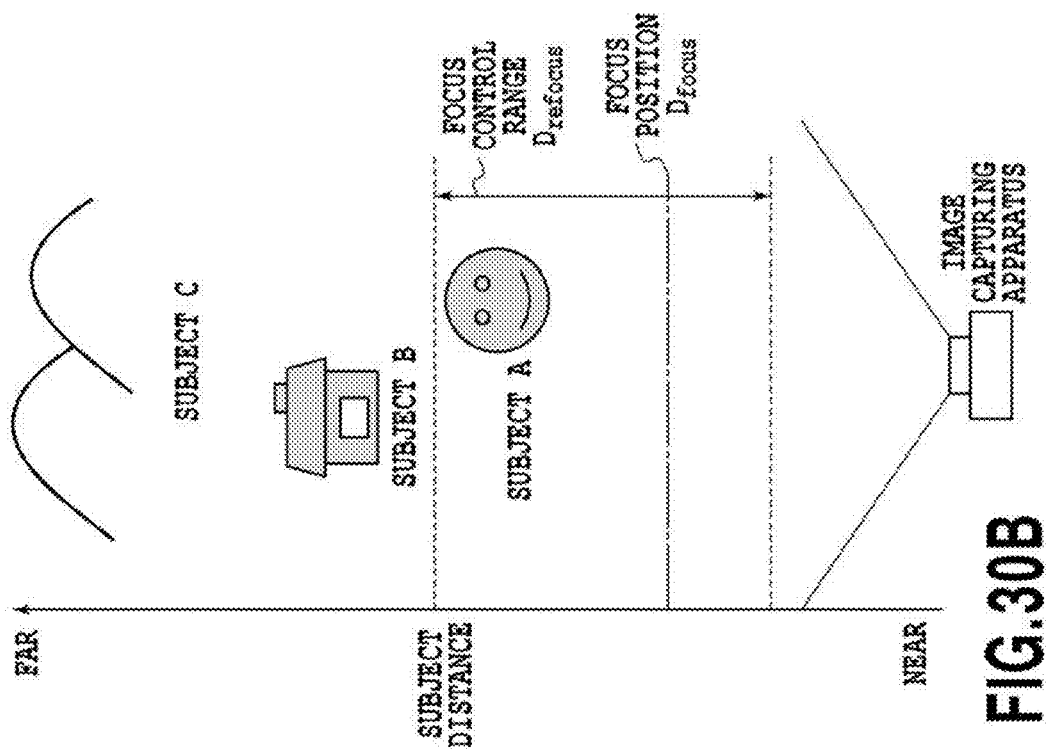
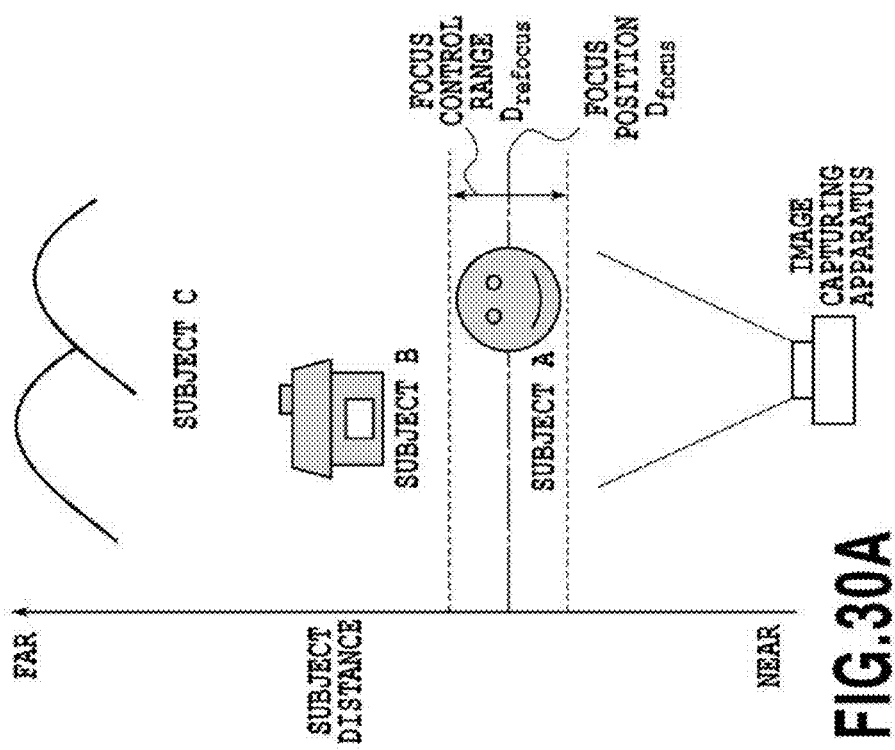
FIG. 30A
FIG. 30B

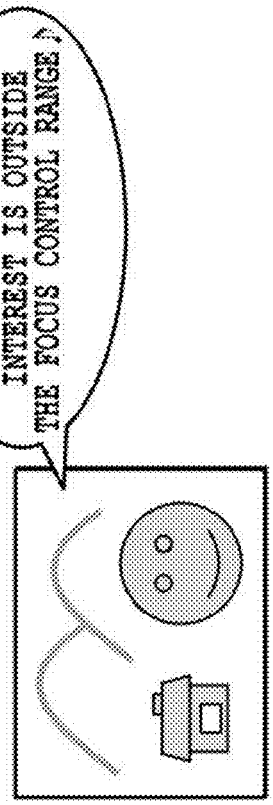
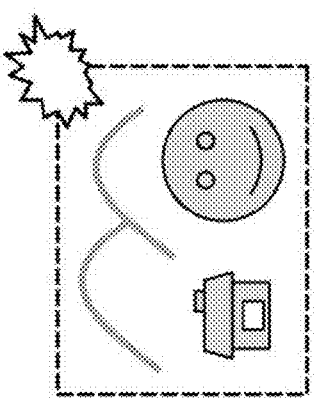
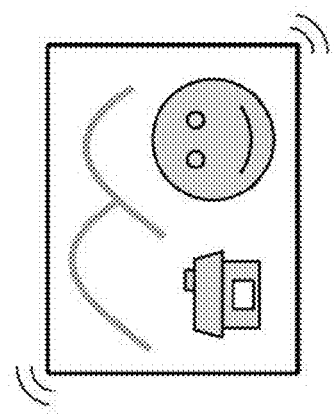
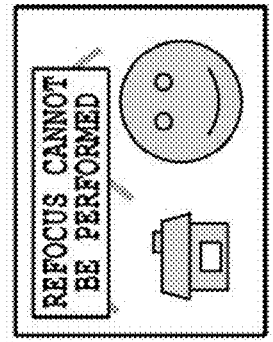
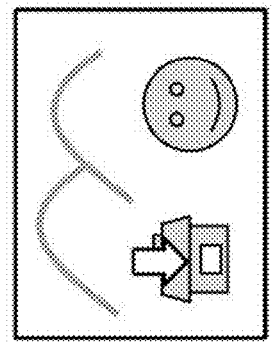

IMAGE PROCESSING APPARATUS, IMAGE CAPTURING APPARATUS, IMAGE PROCESSING METHOD, AND STORAGE MEDIUM

BACKGROUND OF THE INVENTION

1. Field of the Invention

The present invention relates to an image processing apparatus, an image capturing apparatus, an image processing method, and a storage medium for obtaining information about focus control of a subject.

2. Description of the Related Art

Conventionally, in the case where an image was captured by a camera out of focus, it was necessary to recapture the image after performing focusing again. Further, in the case where it was desired to obtain focused images of a plurality of subjects the depths of which are different, it was necessary to capture the image of each subject in focus a plurality of times.

In recent years, a technique called light field photography has been developed, which is capable of adjusting the focus position in the later image processing (refocus) by adding a new optical element to the optical system to acquire images from multiple viewpoints.

By using this technique, there is an advantage that a failure in focusing at the time of image capturing can be made up by image processing because it is possible to perform focusing after image capturing. Further, there is also an advantage that it is possible to obtain a plurality of images focused on arbitrary subjects in an image from one captured image by changing the image processing method, and therefore, it is possible to reduce the number of times of image capturing.

In light field photography, from data of images captured from a plurality of viewpoints, the direction and intensity of a light ray that passes through each position (light field) in a plurality of positions in the space are calculated. Then, by using the information of the obtained light field, an image on the assumption that light passes through a virtual optical system and forms the image on a virtual sensor is calculated. By appropriately setting such a virtual optical system and a virtual sensor, refocus described previously is enabled. As an image capturing apparatus for acquiring the light field, a plenoptic camera (for example, Japanese Patent Laid-Open No. 2009-124213) in which a microlens array is arranged behind a main lens and a camera array in which compact cameras are arranged side by side are known. It is possible for both to obtain data of subject images from a plurality of viewpoints captured from different directions by one-time image capturing. In other words, it is possible to represent the light field photography as calculation of an image to be acquired by a virtual sensor under virtual optical conditions from data of images from a plurality of viewpoints.

In the following, the above-described processing to calculate an image acquired by a virtual sensor is referred to as "refocus processing". As refocus processing, there is known a method in which acquired data of images from a plurality of viewpoints is subjected to projective transformation onto a virtual sensor, and added and averaged (for example, WO2008050904).

As a method for displaying an image having been subjected to refocus processing (hereinafter, a refocus image) while varying the focus position, mention is made of, for example, the method disclosed in United States Patent No. 2008/0131019. In this method, the user interface (UI) to adjust the focus position is prepared on the screen on which a refocus image is displayed and the focus position is varied via the UI. Further, in United States Patent No. 2008/0131019, the method is disclosed, which displays a refocus image whose focus position is adjusted to a subject which a user desires to put to a focus position and has given instructions through a screen on which the refocus image is displayed.

By the method proposed by each Patent Literature described above, it is not possible to check whether or not a target subject is included in a range in which refocus can be performed at the time of image capturing or at the time of editing a captured image, and therefore, it is difficult for a user to capture an image or to edit an image in a manner that the user intends.

SUMMARY OF THE INVENTION

The image processing apparatus according to the present invention includes: a specification unit configured to specify a subject of interest within a parallax image obtained by performing image capturing from a plurality of different viewpoints; and a notification unit configured to notify a user of a focused state of the specified subject of interest in an image to be generated by performing image combination processing using the parallax image.

According to the present invention, it is possible to easily grasp a subject whose focus position can be adjusted at the time of image capturing and/or at the time of editing a captured image.

Further features of the present invention will become apparent from the following description of exemplary embodiments (with reference to the attached drawings).

BRIEF DESCRIPTION OF THE DRAWINGS

FIGS. 29A and 29B are diagrams each for explaining a scene in which a focus control range on the object side changes according to the sixth embodiment;

FIGS. 30A and 30B are diagrams each for explaining a scene in which the focus control range on the object side changes according to the sixth embodiment; and FIGS. 31A to 31E are diagrams each for explaining a variation of an aspect of notification to a user in the case where the focused state of a subject of interest has changed.

DESCRIPTION OF THE EMBODIMENTS

Figure 1:
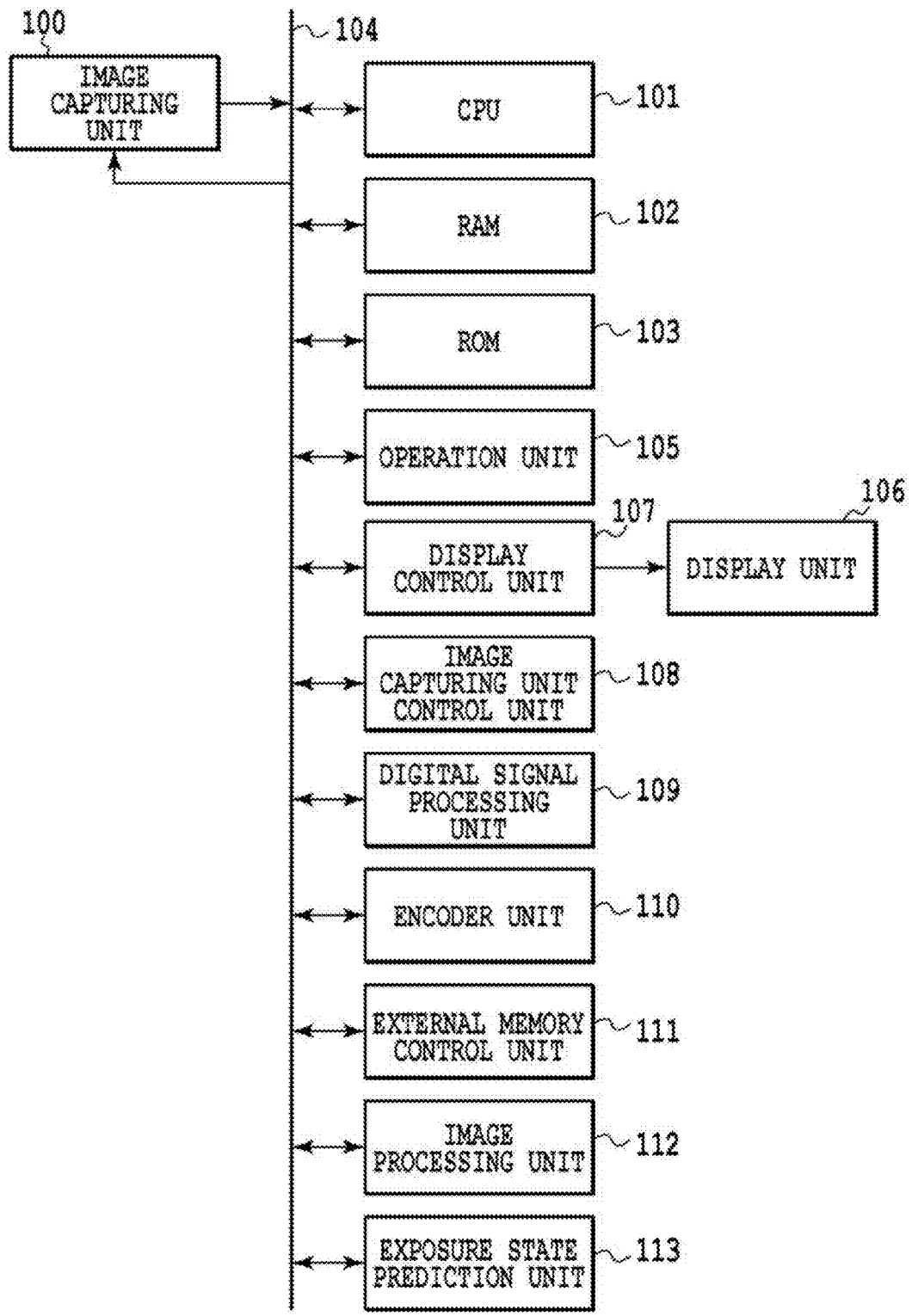
FIG. 1 is a block diagram showing an internal configuration of a camera array image capturing apparatus.

Hereinafter, embodiments of the present invention are explained in detail with reference to the drawings. In each drawing, the same reference numeral is attached to the same member and duplicated explanation is omitted.

[First Embodiment]

FIG. 1 is a block diagram showing an internal configuration of a camera array image capturing apparatus (also referred to simply as a "camera array", as known as camera array system, multiple lens camera, and the like) according to the present embodiment.

An image capturing unit 100 receives light information of a subject by an image sensing element and A/D converts the received signal to obtain image data (digital data). This image data is stored in a recording medium as captured image data upon receipt of instructions to capture an image from a user. The image data acquired by the image capturing unit 100 according to the present embodiment is data of images with parallax obtained by capturing images of a subject space from a plurality of different viewpoints (hereinafter, referred to as "parallax image data"). The image data acquired by the image capturing unit 100 is also used in the so-called live view function to sequentially display images in real time on a display unit 106 provided at the back of the image capturing apparatus. In the following, an image stored in a recording medium in response to instructions to capture an image from a user is referred to as a record image and an image displayed in real time in the live view display is referred to as a live view image.

A central processing unit (CPU) 101 totally controls each unit described below.

A RAM 102 functions as a main memory, a work area, etc. of the CPU 101.

A ROM 103 stores control programs etc. executed in the CPU 101.

A bus 104 is a transfer path of various kinds of data and for example, digital data obtained by the image capturing unit 100 is sent to a predetermined processing unit via the bus 104.

An operation unit 105 configured to receive instructions of a user includes buttons, a mode dial, etc.

As the display unit 106 configured to display images and characters, for example, a liquid crystal display is used. The display unit 106 may have a touch screen function and in such a case, it is also possible to handle user's instructions using the touch screen as an input to the operation unit 105. In the present embodiment, whether a subject to which attention is paid (hereinafter, referred to as a "subject of interest") within a scene exists within a range in which refocus can be performed is determined and the subject of interest for which the determination is made is identified by a user's input via such a touch screen.

A display control unit 107 performs display control of images and characters displayed on the display unit 106.

An image capturing unit control unit 108 performs control of an image capturing system based on instructions from the CPU 101, such as focusing, shutter opening/closing, aperture stop adjustment, etc.

A digital signal processing unit 109 performs various kinds of processing, such as white balance processing, gamma processing, and noise reduction processing, on digital data received via the bus 104.

An encoder unit 110 performs processing to convert digital data into a file format, such as JPEG and MPEG.

An external memory control unit 111 is an interface configured to connect to a PC and other media (for example, hard disk, memory card, CF card, SD card, USB memory).

An image processing unit 112 performs image processing, such as refocus processing, to be described later, on image data acquired by the image capturing unit 100 or image data output from the digital signal processing unit 109. Details of the image processing unit 112 will be described later.

An exposure state prediction unit 113 predicts an exposure state of the image capturing unit 100 at the time of image capturing.

There exist components of the image capturing apparatus other than those described above, however, they are not the main purpose of the present embodiment, and therefore, explanation is omitted.

(Image Capturing Unit)

First, a configuration of the image capturing unit 100 is explained in detail.

Figure 3:
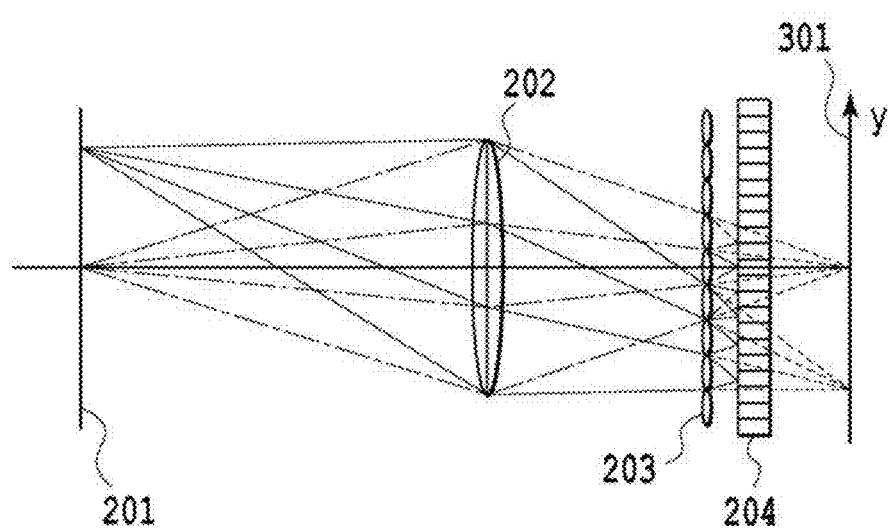
FIG. 3 is a diagram showing a configuration example of the image capturing unit.
Figure 4:
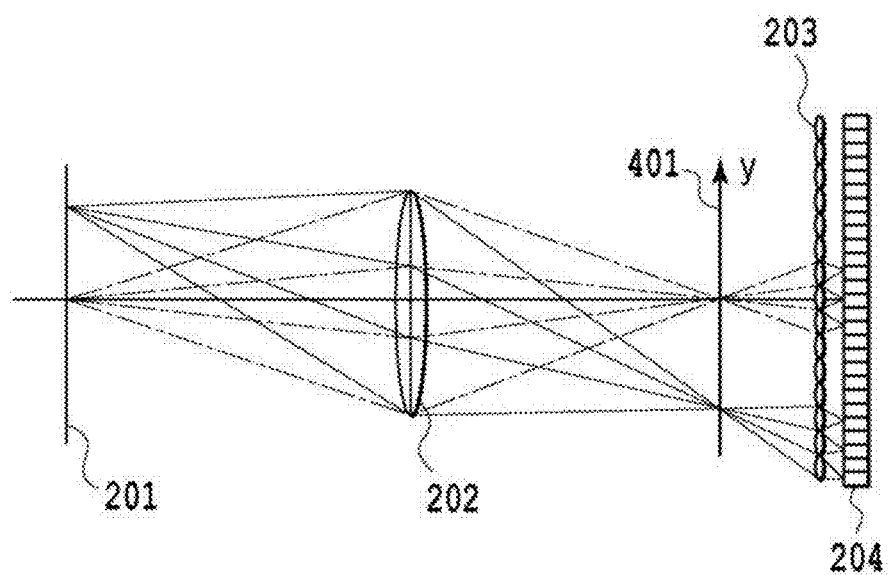
FIG. 4 is a diagram showing a configuration example of the image capturing unit.
Figure 5:
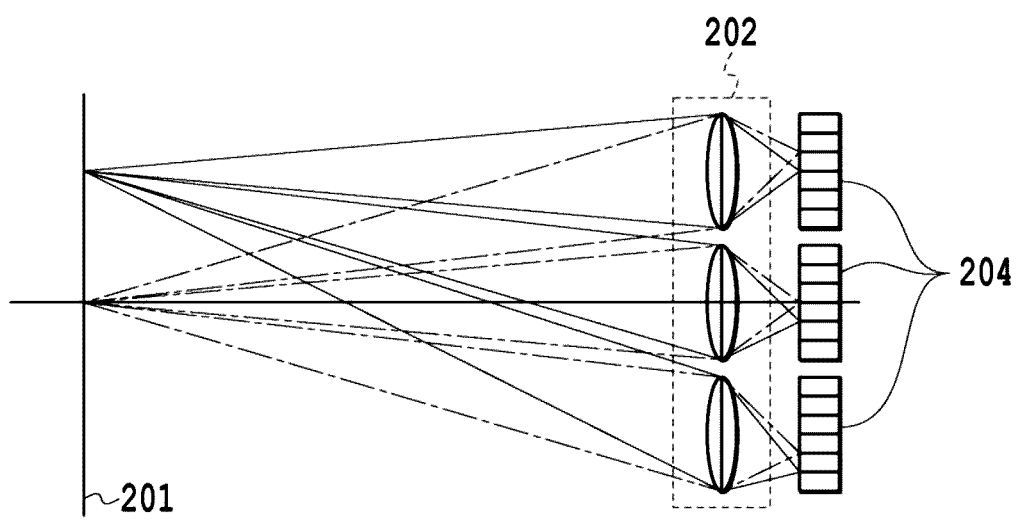
FIG. 5 is a diagram showing a configuration example of the image capturing unit.

As described above, the image capturing unit 100 acquires parallax image data, that is, light field data. A configuration example of the image capturing unit 100 is shown in FIG. 2 to FIG. 5. Among these, FIG. 2 to FIG. 4 each show a configuration in which a lens array is arranged on the image side of an image forming optical system and FIG. 5 shows a configuration in which a plurality of image forming optical systems is arrayed (camera array). As the configuration of the image capturing unit, a camera array configuration capable of obtaining images from a plurality of viewpoints at the same time is desirable. This is because by a method of performing image capturing a plurality of times while varying the position using a single camera image capturing apparatus, what is obtained is parallax image data of images of a subject space captured at different times and in the case where there exists a moving object in the subject space, it is not possible to obtain accurate parallax information.

By performing processing to extract, rearrange, combine, etc., pixels, it is possible to perform refocus, depth-of-field control, viewpoint changing, etc., of the parallax image data acquired by the image capturing unit 100 having the configuration shown in FIG. 2 to FIG. 5. In the present specification, the processing as described above is referred to as image combination processing, and an image generated by the image combination processing is referred to as a combined image. It may also be possible to perform processing such as noise reduction, and processing such as depth-of-field control on a combined image. Further, a range in which refocus can be performed in a subject space is referred to as a "focus control range".

In the following, an internal configuration of the image capturing unit 100 is explained in detail using FIG. 2 as an example.

A lens array 203 is arranged on an image side conjugate surface of an image forming optical system 202 with respect to a subject surface 201. Further, the lens array 203 is configured so that an exit pupil of the image forming optical system 202 and an image sensing element 204 establish substantially a conjugate relationship. Light rays from the subject surface 201 enter different pixels of the image sensing element 204 in accordance with the position and angle of the light ray on the subject surface 201 via the image forming optical system 202 and the lens array 203. Due to this, parallax image data (light field data) is acquired. Here, the lens array 203 has a role to prevent light rays having passed through different positions on the subject surface 201 from entering the same pixel. As a result of that, an image in which a group of pixels of images of the same area on the subject surface 201 captured from a plurality of viewpoints is arranged side by side is acquired in the image sensing element 204.

An object, such as a person and building, does not necessarily need to exist on the subject surface 201 in FIG. 2 to FIG. 5. This is because it is possible to focus a person or building that exists behind or in front of the subject surface 201 by refocus after image capturing.

<Principles of Refocus>

Hereinafter, refocus processing is explained. Refocus is explained in detail in "Fourier Slice Photography" by Ren Ng, 2005 ACM Trans. Graph. 24, p 735 to 744, and therefore, simple explanation is given here. The basic principles of refocus are common in each configuration in FIG. 2 to FIG. 5. Here, the configuration in FIG. 2 is explained as an example. In FIG. 2, the pupil of the image forming optical system is divided two-dimensionally into nine pupils (three in one dimension), and therefore, images from nine viewpoints are acquired as a result. Here, an image corresponding to a certain divided pupil is called a single-viewpoint image.

The nine single-viewpoint images have parallax with respect to one another, and therefore, a relative positional relationship of the subjects on the image changes in accordance with the subject distance. If single-viewpoint images are combined so that a certain subject overlaps itself, subjects located at different subject distances are combined in the shifted state. Because of this shift, subjects located at different subject distances are blurred. The blurring at this time is determined by the pupil corresponding to the single-viewpoint image used for combination and in the case where all the nine single-viewpoint images are combined, it is possible to reproduce the blurring of the image acquired by the image forming optical system 202. The subject overlapped on itself in combination of the single-viewpoint images is arbitrary, and therefore, it is possible to reproduce an image focused on an arbitrary subject in the image forming optical system 202. This is the focus control after image capturing, that is, the principles of refocus.

Figure 6:
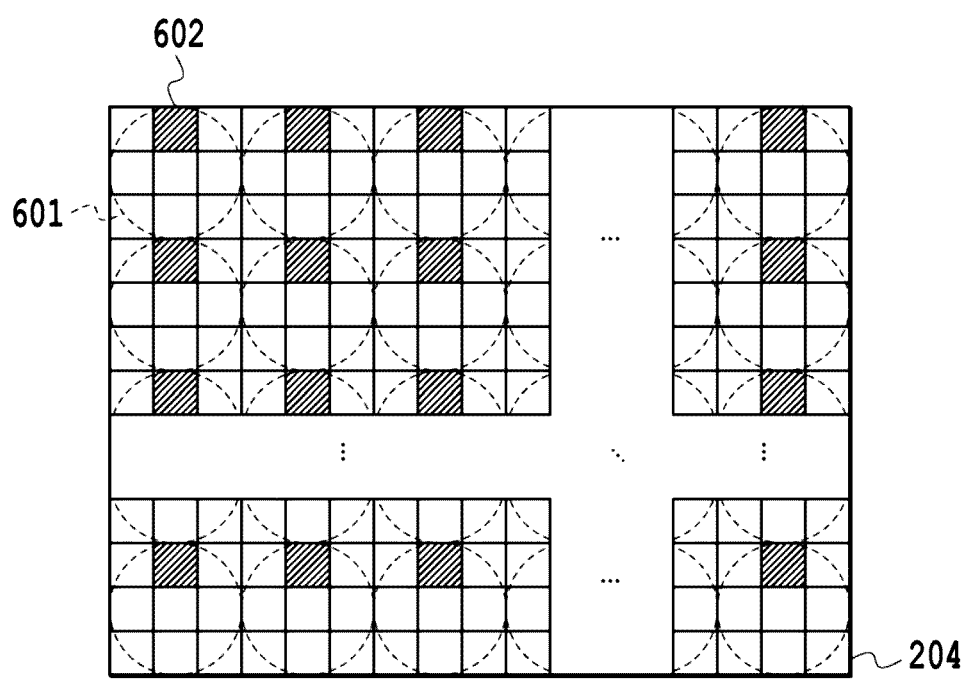
FIG. 6 is a diagram showing a relationship between a lens array and an image sensing element.

Here, a method for generating a single-viewpoint image in the present embodiment is explained. FIG. 6 is a diagram depicting a relationship between the lens array 203 and the image sensing element 204 in FIG. 2. A broken line circle 601 represents an area of a pixel that a light ray having passed through one lens (microlens) configuring the lens array 203 enters. FIG. 6 corresponds to a case where a plurality of microlenses is arranged in the form of a lattice, however, the arrangement of microlenses is not limited to this. For example, the arrangement may have hexagonal symmetry (honeycomb structure). It may also be possible to slightly shift each microlens from a regular arrangement. A slashed area 602 in FIG. 6 represents a pixel that a light ray having passed through the same pupil area of the image forming optical system 202 enters. Consequently, by extracting pixels in the slashed areas 602, it is possible to generate a single-viewpoint image in the case where a subject space is viewed from under the pupil of the image forming optical system 202. Similarly, by extracting pixels whose relative position with respect to the broken line circle 601 is the same, another single-viewpoint image can also be generated.

<Focus Control Range>

Next, a focus control range in which refocus can be performed is explained.

Refocus is performed by superimposing single-viewpoint images, and therefore, it is not possible to refocus a subject blurred within each single-viewpoint image. This is because even by superimposing blurred images, a high frequency component is not obtained and the images remain blurred.

As the pupil is divided into smaller pupils, the depth-of-field in each single-viewpoint image becomes deeper, and therefore, the focus control range is extended. That is, the focus control range depends on the divided pupils of the image forming optical system 202. However, the depth-of-field in the single-viewpoint image does not necessarily agree with the focus control range. This is because the focus control range changes depending on the resolution ratio between the single-viewpoint images and the combined image obtained by combining them. For example, in the case where the resolution of the combined image is lower than the resolution of the single-viewpoint image from each viewpoint, the sampling pitch of the spatial component in the combined image becomes large relative to that in the single-viewpoint image. Because of this, the depth-of-field of the combined image becomes deeper than that of the single-viewpoint image and accompanying that, the focus control range is extended. Conversely, in the case where the resolution of the combined image is higher than that of the single-viewpoint image, the focus control range becomes narrower than the depth-of-field of the single-viewpoint image.

As a method for making the resolution of the combined image higher than that of the single-viewpoint image, the use of the super-resolution by pixel shifting etc. can be thought of. As described previously, in refocus, combination is performed by shifting the single-viewpoint images relative to one another. In the case where the amount of shift at this time is not an integer multiple of the pixel pitch of the single-viewpoint image, it is possible to perform the super-resolution by pixel shifting, and the resolution of the combined image can be increased.

From the discussion hitherto, it is known that it is necessary to take into consideration the conditions at the time of combining the single-viewpoint images in order to acquire an accurate focus control range in the combined image.

Next, how the focus control range of a combined image is derived is explained. The focal depth corresponding to the depth-of-field of a combined image is considered. A permissible circle of confusion of the focal depth is taken to be $\epsilon$ and the sampling pitch of the angular component of a light ray is taken to be $\Delta u$. At this time, coefficients $\alpha_\pm$ of refocus are given by expression (1) below.

$$\alpha_\pm = \frac{1}{1 \pm \epsilon/\Delta u} \qquad \text{Expression (1)}$$

Figure 7:
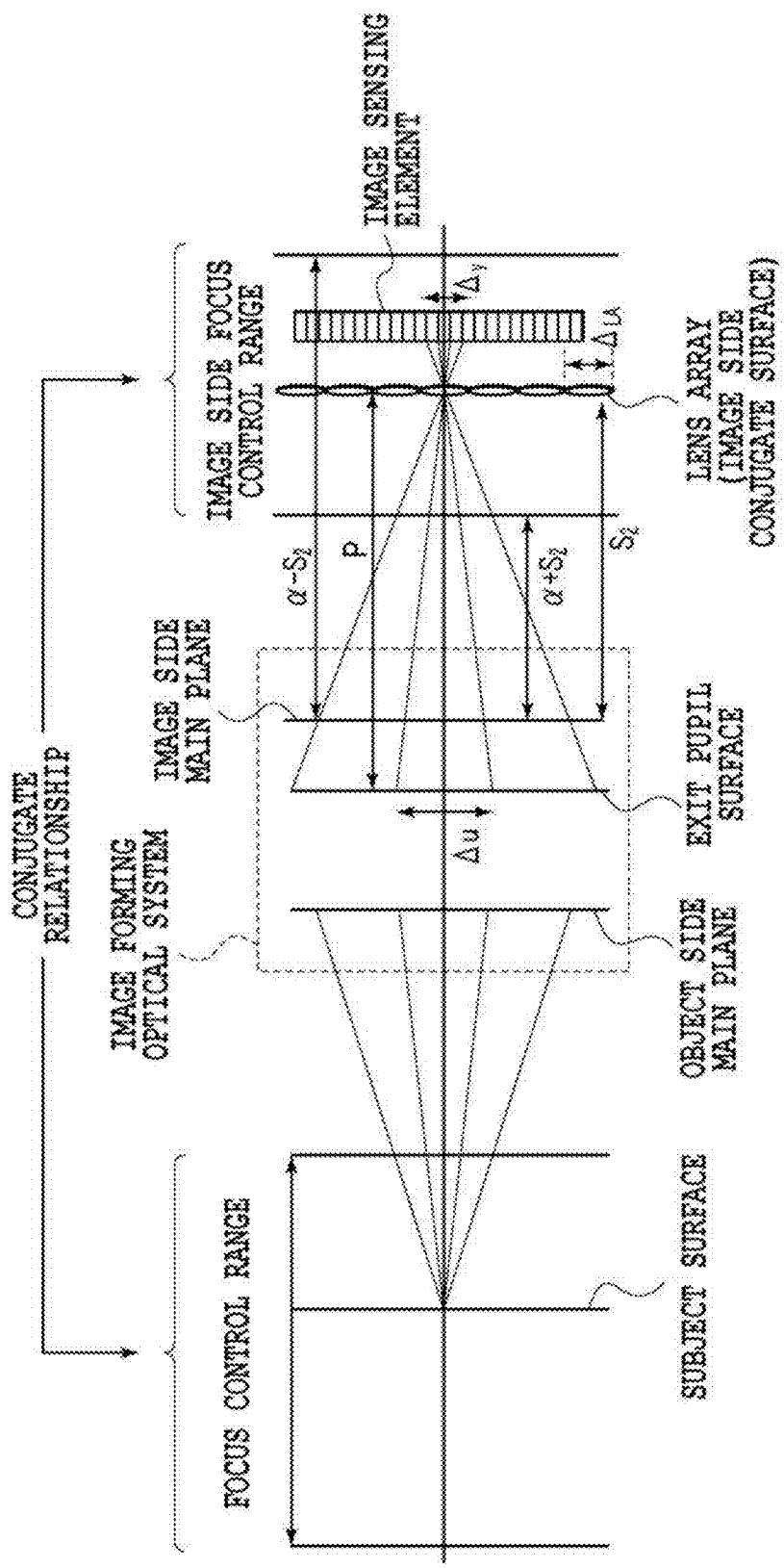
FIG. 7 is a diagram showing a relationship between an image side focus control range and an object side focus control range according to a first embodiment.

A range (range conjugate with respect to the image forming optical system 202) conjugate with a range $\alpha_+ s_2$ to $\alpha_- s_2$ in which refocus can be performed on the image side expressed using the expression (1) is the focus control range, which is a range in which refocus can be performed on the object side. FIG. 7 schematically shows the relationship of the expression (1) and the center position of the range in which refocus can be performed is the focus position of the image forming optical system 202 (in this case, the position of the lens array 203 is the center position of the range in which refocus can be performed). Here, $s_2$ is an interval between the image side main plane of the image forming optical system 202 and the image side conjugate surface of the image forming optical system 202 with respect to the subject surface 201. In FIG. 7, the image side focus control range refers to a range conjugate with the focus control range via the image forming optical system 202. Further, $\Delta y$ is the sampling pitch of the two-dimensional intensity distribution of light and in the configuration in FIG. 2, it is equals to a pitch $\Delta_{LA}$ of the lens array 203. The relationship of the expression (1) holds also in each of the configurations in FIG. 2 to FIG. 5.

Then, because the pixel pitch $\Delta$ of the image sensing element 204 is sufficiently small compared to an exit pupil distance P of the image forming optical system 202, and therefore, the expression (1) can be approximated as expression (2) below.

$$\alpha_\pm s_2 = s_2 \mp NF\epsilon \qquad \text{Expression (2)}$$

Here, the exit pupil distance P of the image forming optical system 202 is an interval between an exit pupil surface of the image forming optical system 202 and the image side conjugate surface of the image forming optical system 202 with respect to the subject surface 201. Further, N is the number of one-dimensionally divided pupils of the image forming optical system 202 and F is the F-number of the image forming optical system 202. It is possible to derive the F-number by expression (3) below from a focal length f and a lens effective diameter D of the image forming optical system 202.

$$F = f/D \qquad \text{Expression (3)}$$

That is, the range in which refocus can be performed (focus control range) is determined according to the number of one-dimensionally divided pupils of the image forming optical system and the angle of field range defined by the focal length and the lens effective diameter of the image forming optical system. Further, according to the resolution of the combined image data, to be described later, the range in which refocus can be performed is determined.

<Image Processing Unit>

Next, a configuration of the image processing unit is explained in detail.

Figure 8:
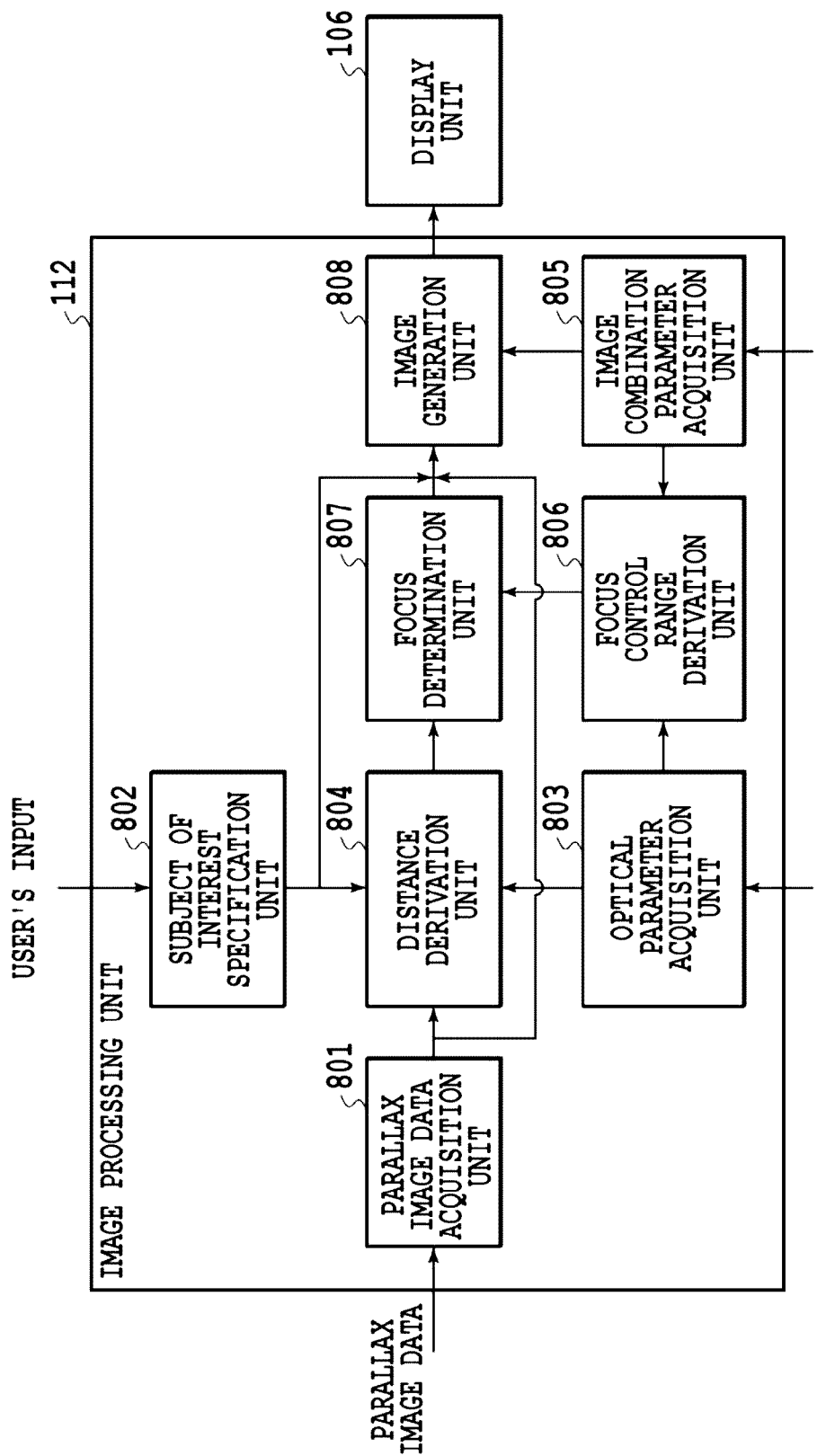
FIG. 8 is a block diagram showing an internal configuration of an image processing unit according to the first embodiment.

FIG. 8 is a block diagram showing an internal configuration of the image processing unit 112 according to the present embodiment.

A parallax image data acquisition unit 801 acquires parallax image data supplied from the image capturing unit 100 etc.

A subject of interest specification unit 802 specifies a subject of interest within an acquired parallax image (subject space) based on a user's input via the operation unit 105. In the case of the present embodiment, a person etc. within a scene identified by a user via a touch screen as the operation unit 105 is specified as a subject of interest. Information of the specified subject of interest is sent to a distance derivation unit 804 and an image generation unit 808.

An optical parameter acquisition unit 803 acquires optical parameters of the image capturing unit 100 necessary for the distance derivation unit 804 and a focus control range derivation unit 806. Here, optical parameters refer specifically to a configuration of the image capturing unit 100, the exposure state of an aperture etc., the focus position, the focal length in a zoom lens, etc.

The distance derivation unit 804 derives information of the distance to the specified subject of interest. The distance to the subject of interest is derived using the parallax image data supplied from the parallax image data acquisition unit 801 and the optical parameters supplied from the optical parameter acquisition unit 803. Details of distance derivation will be described later.

An image combination parameter acquisition unit 805 acquires parameters (resolution after combination, viewpoint, focus position, depth-of-field, etc.) necessary for image combination.

The focus control range derivation unit 806 derives a focus control range using the optical parameters supplied from the optical parameter acquisition unit 803 and the image combination parameters supplied from the image combination parameter acquisition unit 805.

A focus determination unit 807 determines whether or not the subject of interest is included within the focus control range by comparing the distance to the subject of interest supplied from the distance derivation unit 804 and the focus control range supplied from the focus control range derivation unit 806.

The image generation unit 808 generates a display image reflecting the determination result of the focus determination unit 807 (display image indicating the focused state of the specified subject of interest). The generation of a display image may be performed for a live view image before image capturing or for a record image after image capturing. The display image may be based on an arbitrary single-viewpoint image included in the parallax image or may be based on a combined image obtained by combining a plurality of single-viewpoint images. The data of the generated display image is output to the display unit 106. Further, it is supposed that the image generation unit 808 according to the present embodiment also performs image combination processing in accordance with the image combination parameters, however, it may also be possible to provide a processing unit configured to perform image combination processing separately from the image generation unit 808.

Figure 9:
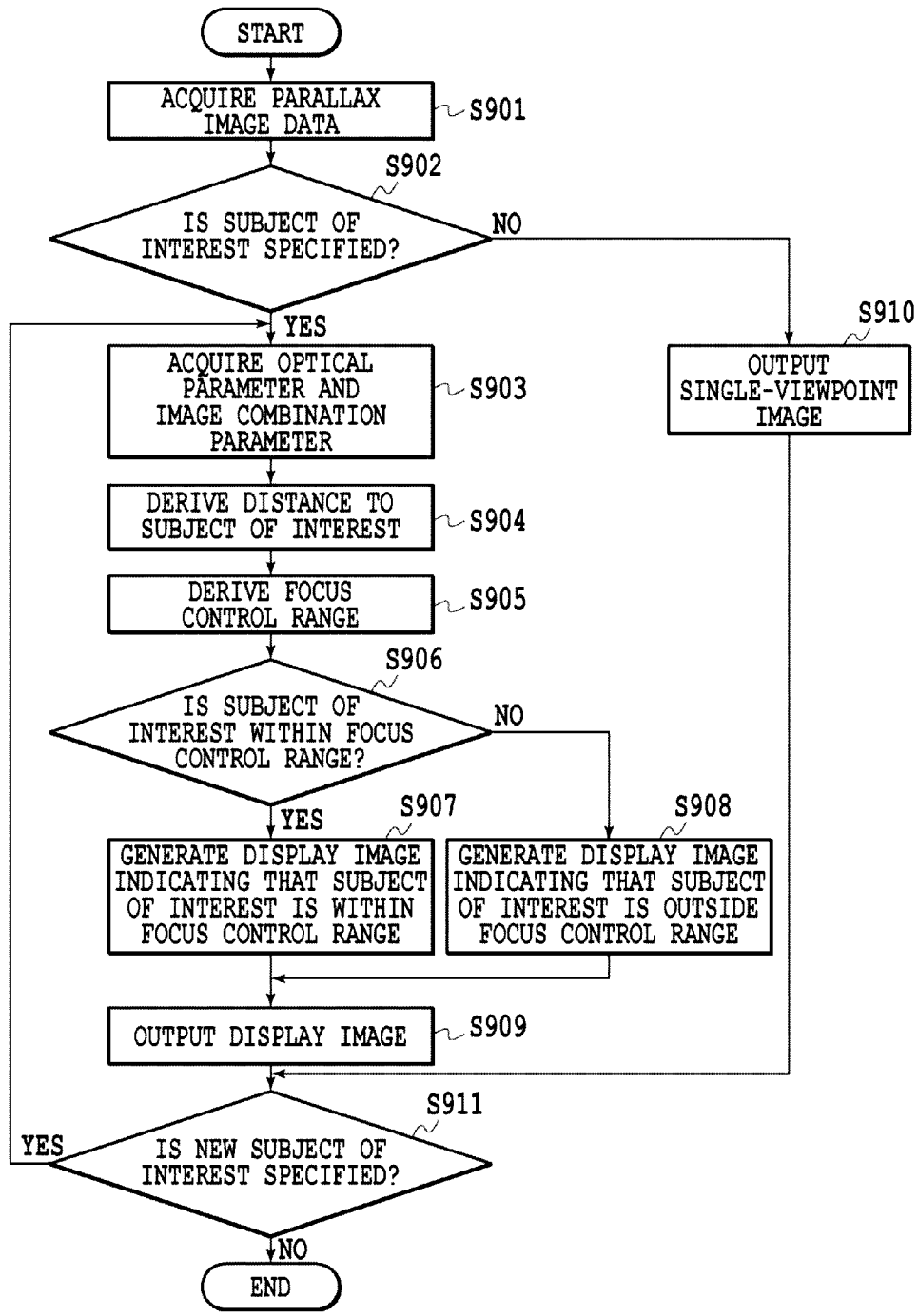
FIG. 9 is a flowchart showing a flow of processing in the image processing unit according to the first embodiment.

FIG. 9 is a flowchart showing a flow of processing in the image processing unit 112 according to the present embodiment. The series of processing is performed by the CPU 101 executing a computer executable program in which a procedure shown below is described after reading the program from the ROM 103 onto the RAM 102.

At step 901, the parallax image data acquisition unit 801 acquires parallax image data acquired by the image capturing unit 100. The parallax image data acquired here may be parallax data as a live view image or may be parallax data as a record image as described above.

At step 902, the CPU 101 determines whether a subject of interest in accordance with a user's input is specified in the subject of interest specification unit 802. In the case where a subject of interest is specified, the procedure proceeds to step 903. On the other hand, in the case where no subject of interest is specified, the procedure proceeds to step 910.

At step 903, the optical parameter acquisition unit 803 and the image combination parameter acquisition unit 805 acquire the optical parameters and the image combination parameters, respectively.

At step 904, the distance derivation unit 804 derives the distance to the specified subject of interest by a method or the like of performing stereo matching between the single-viewpoint images included in the parallax image. For example, in the stereo matching method, first, a single-viewpoint image that serves as a reference (for example, a single-viewpoint image corresponding to the light ray passing through the vicinity of the center of the pupil) is divided into a plurality of blocks and among the other single-viewpoint images, a block position nearest to the target block is detected. Then, by using the positional relationship between the two blocks, the positional relationship between the corresponding pupils, and the angle of view of each pupil, the distance of the target block is derived by the triangulation. As the single-viewpoint image that serves as a reference, it may also be possible to select a single-viewpoint image the viewpoint position of which is other than the center. Further, as a method for acquiring distance information, there are a method, such as DFD (Depth From Defocus), and a method of performing measurement using a range finding unit that utilizes infrared rays etc., besides the stereo matching method described above.

At step 905, the focus control range derivation unit 806 derives a focus control range in the case where image combination of the parallax image acquired at step 901 is performed by using the optical parameters and the image combination parameters acquired at step 903. Detailed explanation is given below.

As described previously, the focus control range changes depending on the resolution ratio between each single-viewpoint image and the combined image, however, here, for simplification of explanation, a case where the resolution ratio is 1 is considered. In the case where the image side focus control range is within the range expressed by the above-described expression (2), it can be concluded that an area in which focus control can be performed is already acquired. Consequently, the image side conjugate surface of the image forming optical system 202 with respect to the subject surface 201 and an image side focus control range $d_{refocus}$ are required only to satisfy expression (4) below.

$$-NF\epsilon \le d_{refocus} \le NF\epsilon \qquad \text{Expression (4)}$$

Figure 2:
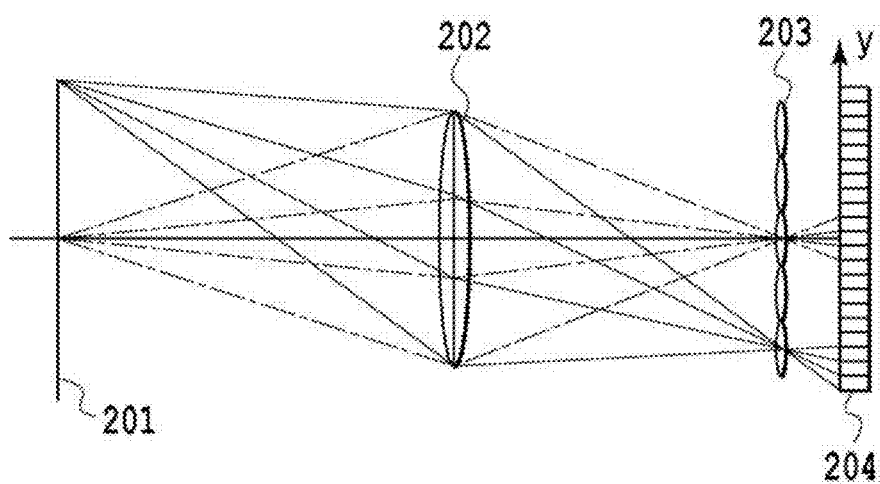
FIG. 2 is a diagram showing a configuration example of an image capturing unit.
Figure 10:
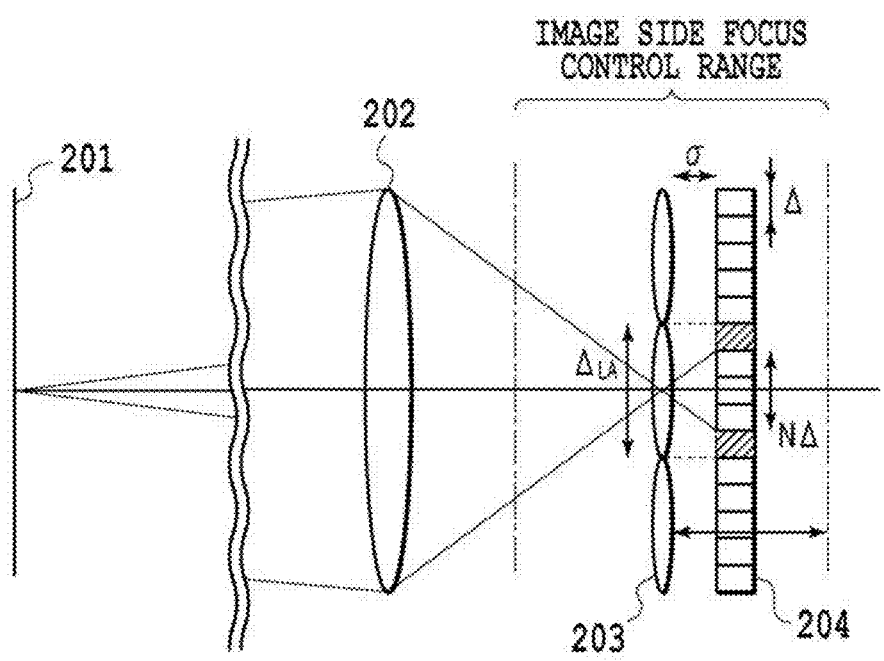
FIG. 10 is a diagram showing an optical arrangement in the configuration of the image capturing unit shown in FIG. 2.

FIG. 10 is a diagram showing an optical arrangement in the configuration of the image capturing unit 100 shown in FIG. 2, and $\sigma$ is an interval between the image side main plane of the lens array 203 and the image sensing element 204. In FIG. 10, two parallel broken lines extending from both ends of the microlens at the center represent an area of the image sensing element 204 corresponding to the microlens and pixels with slashes within the image sensing element 204 represent a dead zone that no light rays enter. In the present embodiment, the lens array 203 is configured so as to prevent a dead zone from being produced and in this case, $\Delta_{LA}=\Delta N$ holds. However, the configuration is not limited to this and there may exist a dead zone. From FIG. 10, it is known that $NF=\sigma/\Delta$ holds in terms of geometry. By characterizing the size of the permissible circle of confusion that determines the focal depth by the sampling pitch $\Delta y = \Delta_{LA}$ of the spatial component, the expression (4) can be written as expression (5) below.

$$-\frac{\epsilon}{\Delta_{LA}} \le \frac{d_{refocus}\Delta}{\Delta_{LA}\sigma} \le \frac{\epsilon}{\Delta_{LA}} \qquad \text{Expression (5)}$$

$$\left(\frac{d_{refocus}}{NF\Delta_{LA}} = \frac{d_{refocus}\Delta}{\Delta_{LA}\sigma}\right)$$

Next, a case is considered, where the resolution ratio between the single-viewpoint image and the combined image is other than 1. The angle of view of the combined image and the single-viewpoint image used for combination is the same, and therefore, in the case where the resolution ratio is other than 1, $\Delta y$ differs between both. In general, the smaller $\Delta y$, the smaller the permissible circle of confusion is, and the larger $\Delta y$, the larger the permissible circle of confusion is. Because of this, it is possible to extend the above-mentioned expression (5) as expression (6) below by taking the ratio of $\Delta y$ between the single-viewpoint image and the combined image.

$$-\frac{\epsilon}{\Delta_{LA}}\sqrt{\frac{R_{mono}}{R_{comb}}} \le \frac{d_{refocus}\Delta}{\Delta_{LA}\sigma} \le \frac{\epsilon}{\Delta_{LA}}\sqrt{\frac{R_{mono}}{R_{comb}}} \qquad \text{Expression (6)}$$

Here, $R_{mono}$ denotes the resolution of the single-viewpoint image used for combination and $R_{comb}$ denotes the resolution of the combined image. The ratio of $\Delta y$ is obtained by calculating the square root of the ratio between $R_{mono}$ and $R_{comb}$. It is known that the resolution $R_{mono}$ of the single-viewpoint image is represented by expression (7) below from FIG. 10.

$$R_{mono} = \left(\frac{\Delta}{\Delta_{LA}}\right)^2 R_{total} \qquad \text{Expression (7)}$$

Here, $R_{total}$ denotes the number of effective pixels of the image sensing element 204. From the expression (6) and the expression (7), conditional expression (8) below that the image side focus control range needs to satisfy is obtained.

$$-10.0 \leq \frac{d_{refocus}}{\sigma} \sqrt{\frac{R_{comb}}{R_{total}}} \leq 10.0 \qquad \text{Expression (8)}$$

In the above-mentioned conditional expression (8), the range is set between ±10.0, however, by setting the range between ±6.0, it is possible to obtain a clearer combined image. More desirably, by setting the range between ±3.0, it is possible to obtain a still clearer combined image.

In the following, a specific example of each value is shown.

Number $R_{total}$ of effective pixels of the image sensing element 204: 46.7×10$^6$ (pix)

Interval σ between the image side main plane of the lens array 203 and the image sensing element 204: 0.0374 (mm)

Pixel pitch Δ of the image sensing element 204: 0.0043 (mm)

Pitch $\Delta_{LA}$ of the lens array 203: 0.0129 (mm)

Focal length f of the image forming optical system 202: 14.0 (mm)

F-number: 2.9

Number N of one-dimensionally divided pupils: 3

Resolution $R_{mono}$ per single-viewpoint image: 5.2×10$^6$ (pix)

The range of the conditional expression (8), the resolution $R_{comb}$ of the combined image corresponding to each range of the conditional expression (8), and $d_{refocus}$ corresponding to each resolution of the combined image are, for example, as shown in Table (1) below.

TABLE (1)

|  | Range of Expression (8) | | |
|---|---|---|---|
|  | ±2.5 | ±5.5 | ±9.5 |
| $R_{comb}$ | 8.0 × 10$^6$ pix | 5.2 × 10$^6$ pix | 2.0 × 10$^6$ pix |
| $d_{refocus}$ | 0.2260 (mm) | 0.6166 (mm) | 1.7174 (mm) |

By a user's input via the operation unit 105, the resolution $R_{comb}$ of the combined image is selected, for example, from among the above-mentioned three kinds.

In the above-mentioned example, it is known that in order to generate a combined image of, for example, 8.0×10$^6$ pix, the resolution needs to be increased by the super-resolution by pixel shifting etc. because the resolution $R_{mono}$ per single-viewpoint image is 5.2×10$^6$ pix. The above-described value of each resolution $R_{comb}$ of the combined image is an example and the number of kinds is not limited to three. It is only necessary to appropriately determine $R_{comb}$ and $d_{refocus}$ that satisfy the above-mentioned conditional expression (8).

It is possible to calculate the focus control range from the image forming formula by using the image side focus control range and the focal length and the focus position of the image forming optical system 202. The information of the focus control range acquired in this manner may be attached to the parallax image data or the combined image data as tag information and stored in the ROM 103. Alternatively, it may also be possible to create a table of the focus control range corresponding to a variety of conditions and store it in the ROM 103, and then to read data corresponding to an input condition instead of performing the above-described arithmetic operation to derive the focus control range.

As another method for acquiring a focus control range, a method can be thought of, which evaluates the contrast etc. of a subject existing in the focus position by actually generating a combined image for which refocus is performed. However, by this method, it is necessary to generate a combined image while moving the focus position and to sequentially determine whether refocus can be performed successfully, and therefore, it takes time to perform the processing. Further, in the case where no subject exists in the focus position where refocus is performed, evaluation cannot be carried out, and therefore, it is not possible to acquire an accurate focus control range. Consequently, it is desirable to use the previously-described method in order to acquire a focus control range.

Explanation is returned to the flowchart in FIG. 9.

At step 906, the focus determination unit 807 determines whether or not the specified subject of interest is within the focus control range derived at step 905. Specifically, the focus determination unit 807 compares the distance to the subject of interest supplied from the distance derivation unit 804 with the focus control range supplied from the focus control range derivation unit 806 and determines whether or not the subject of interest is included within the focus control range by using expression (9) below.

$$D_{near} \leq D_{obj} \leq D_{far} \qquad \text{Expression (9)}$$

In the case where the above-mentioned expression is satisfied, it is determined that the subject of interest is included within the focus control range.

Figure 11:
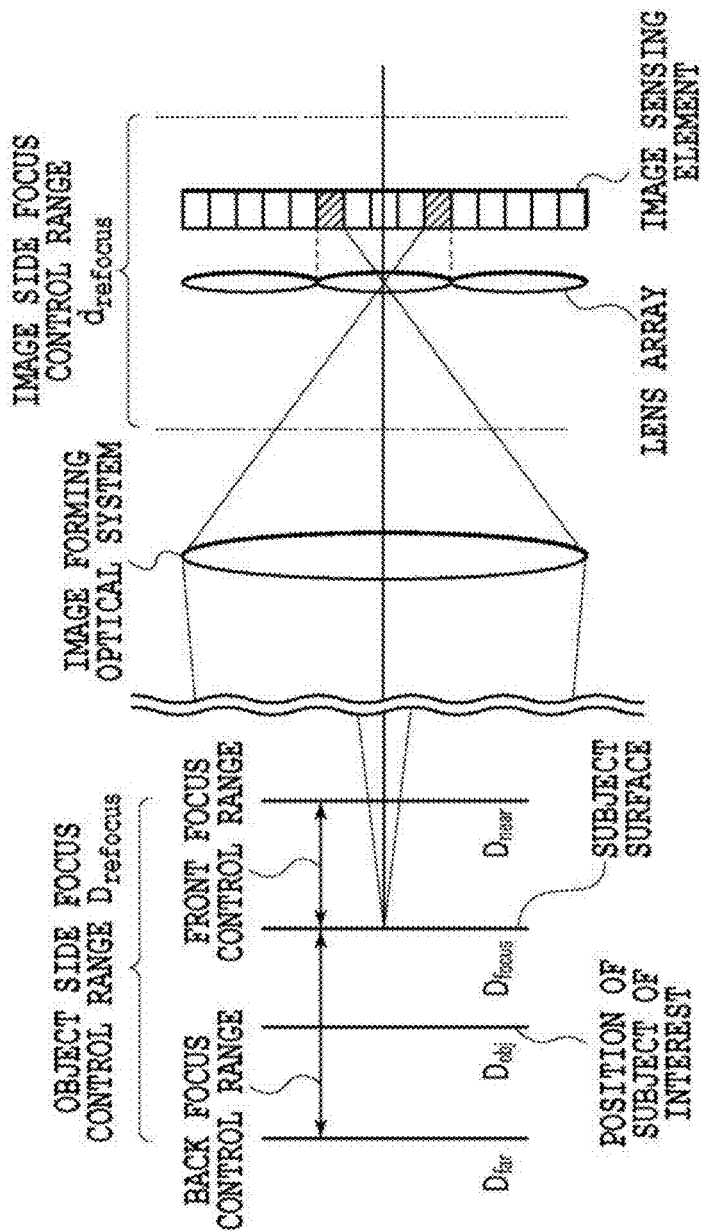
FIG. 11 is a diagram for explaining details of the object side focus control range.

Here, $D_{obj}$ is the distance on the object side from the image capturing apparatus to the subject of interest. $D_{near}$ is a front focus end position within an interval $D_{refocus}$ of the object side focus control range and nearest to the image capturing apparatus. $D_{far}$ is a back focus end position within the interval $D_{refocus}$ of the object side focus control range and farthest from the image capturing apparatus. FIG. 11 shows a positional relationship between a subject surface $D_{focus}$ on the object side, the position $D_{obj}$ on the object side corresponding to the position of the subject of interest, the front focus end position $D_{near}$, and the back focus end position $D_{far}$. $D_{refocus}$ is the object side focus control range represented by replacing the image side focus control range $d_{refocus}$ with that on the object side.

In the case where it is determined that the subject of interest is within the focus control range, the procedure proceeds to step 907. On the other hand, in the case where it is determined that the subject of interest is not within the focus control range, the procedure proceeds to step 908.

At step 907, the image generation unit 808 generates a display image indicating that the subject of interest is within the focus control range.

At step 908, the image generation unit 808 generates a display image indicating that the subject of interest is outside the focus control range.

Figure 12:
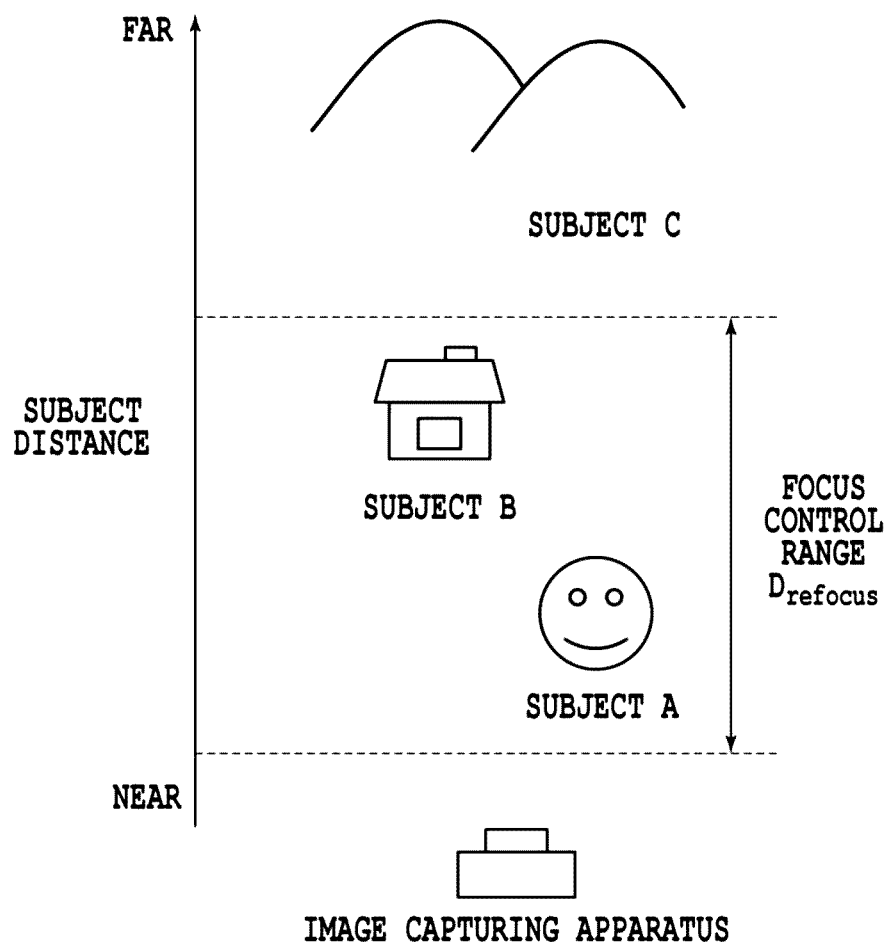
FIG. 12 is a diagram showing a positional relationship between the image capturing apparatus and subjects.
Figure 13A:
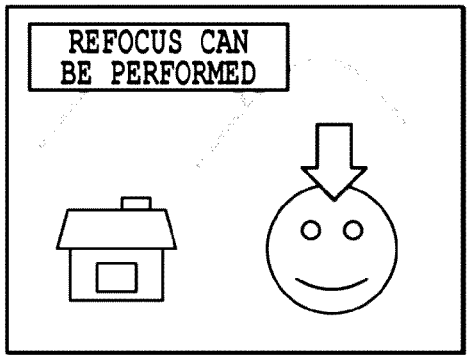
FIGS. 13A to 13E are each a diagram showing an example of a display image according to the first embodiment.
Figure 13B:
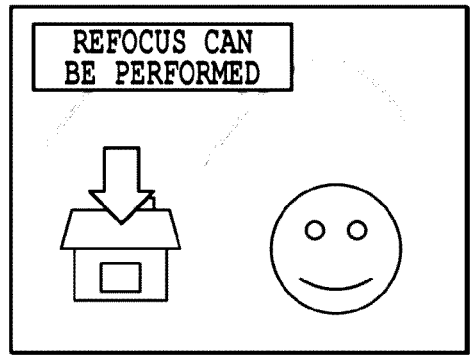
Figure 13C:
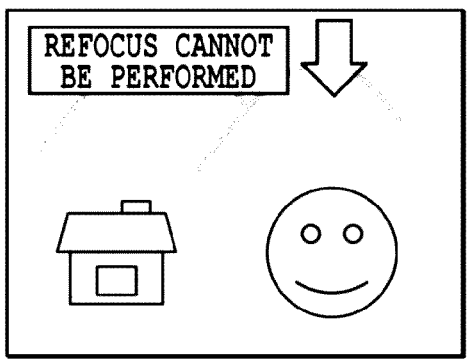
Figure 13D:
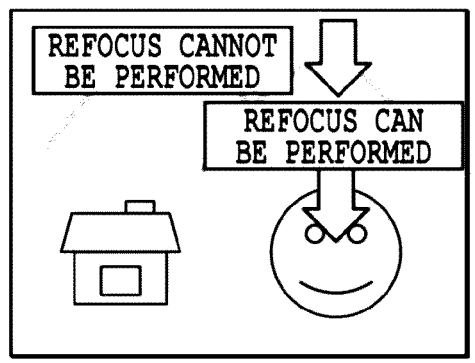
Figure 13E:
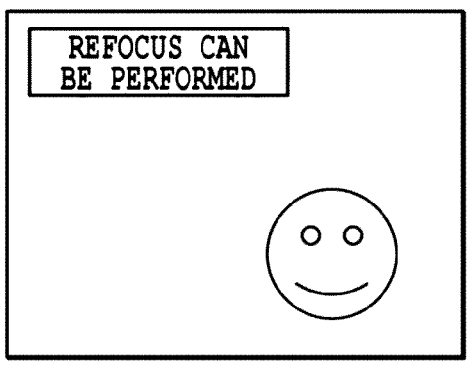

Here, the display image generated at steps 907 and 908 is explained. FIG. 12 is a diagram showing a positional relationship between the image capturing apparatus and subjects and three kinds of subjects (subject A, subject B, subject C) exist in positions different from the image capturing apparatus. The subject A is in the position nearest to the image capturing apparatus and the subject C is in the position farthest from the image capturing apparatus. In FIG. 12, $D_{refocus}$ denotes the object side focus control range represented by replacing the image side focus control range $d_{refocus}$ derived at step 905 with that on the object side. In the following, in the case where the "focus control range" is simply referred to, it is assumed that the "focus control range" refers to the object side focus control range. In FIG. 12, it is known that the subject A and the subject B are within the range of the focus control range $D_{refocus}$ and the subject C is outside the focus control range $D_{refocus}$. An example of the display image generated in such situations is shown in each of FIGS. 13A to 13E. FIGS. 13A and 13B are each an example of the display image in the case where the specified subjects of interest are the subject A and the subject B, respectively. Because the subject A and the subject B are within the range of the focus control range $D_{refocus}$, a message that "Refocus can be performed" indicating that refocus can be performed is shown in an overlay display on the image (here, single-viewpoint image). FIG. 13C is an example of the display image in the case where the specified subject of interest is the subject C. Because the subject C is outside the range of the focus control range $D_{refocus}$, a message that "Refocus cannot be performed" indicating that refocus cannot be performed is shown in an overlay display on the image. FIG. 13D is an example of the display image in the case where a plurality of subjects of interest is specified. In the case where a user identifies a plurality of subjects of interest at the same time, whether or not each subject of interest is within the range of the focus control range $D_{refocus}$ is determined and a message indicating whether or not refocus can be performed is displayed for each subject of interest. An arrow on the subject of interest in the display image in each of FIGS. 13A to 13D is displayed in order to make it easy to check the specified subject of interest, and the method is not limited to the method that uses an arrow and any method by which a subject of interest can be recognized may be accepted. FIG. 13E is an example of the display image based on a combined image in the state where only the specified subject of interest (subject A) is focused (other subjects (subjects B and C) other than the subject of interest are in the blurred state). In this case, only the subject of interest is focused, and therefore, it is possible to recognize the specified subject of interest intuitively. In this manner, the display image indicating whether the subject of interest is within the focus control range is generated based on an arbitrary single-viewpoint image included in the parallax image or based on the combined image obtained by combining a plurality of single-viewpoint images. At this time, in the case where the display image is generated based on the combined image, the image generation unit 808 generates the above-described display image after performing predetermined image combination processing in accordance with the image combination parameters acquired at step 903.

Explanation is returned to the flowchart in FIG. 9.

At step 909, the image generation unit 808 outputs data of the display image generated at step 907 or step 908 to the display unit 106.

At step 910, the image generation unit 808 outputs data of an arbitrary single-viewpoint image (for example, single-viewpoint image from the viewpoint nearest to the pupil center of the image forming optical system 202) of the acquired parallax image data to the display unit 106. It may also be possible to output a combined image obtained by combining a plurality of single-viewpoint images in place of a single-viewpoint image.

At step 911, the CPU 101 determines whether a new subject of interest is specified by the subject of interest specification unit 802. In the case where a new subject of interest is specified, the procedure returns to step 903 and the series of processing at step 903 to step 911 is repeated. On the other hand, in the case where no new subject of interest is specified, the present processing is exited.

In the present embodiment, by displaying the display image as shown in FIGS. 13A to 13E in the display unit of the image capturing apparatus, notification of whether or not focus control can be performed on the subject of interest identified by a user is made. However, the notification method is not limited to this. For example, it may also be possible to display whether or not focus control can be performed on the subject of interest identified by a user in a display device (for example, a display etc. prepared separately from the image capturing apparatus and used at the time of editing a parallax image) connected to the image capturing apparatus. Alternatively, it may also be possible to simultaneously make notification by a method using sound, vibration, light etc. other than visual information or to use the method in place of the above-mentioned method.

As explained above, according to the present embodiment, at the time of image capturing or at the time of editing a captured image, notification of whether or not focus control can be performed on the subject of interest identified by a user is made. Due to this, it is made possible for a user to easily grasp a subject(s) the focus position of which can be adjusted at the time of image capturing and/or at the time of editing a captured image.

[Second Embodiment]

The first embodiment is an aspect in which whether or not focus control can be performed on the subject of interest identified by a user is determined and the determination result is notified to the user. Next, an aspect is explained as a second embodiment, in which a subject of interest is specified automatically and whether or not focus control can be performed on the subject of interest specified automatically is determined. The parts same as those in the first embodiment are simplified or omitted in the explanation and in the following, the points peculiar to the present embodiment are explained mainly.

<Configuration Diagram of Image Processing Unit>

Figure 14:
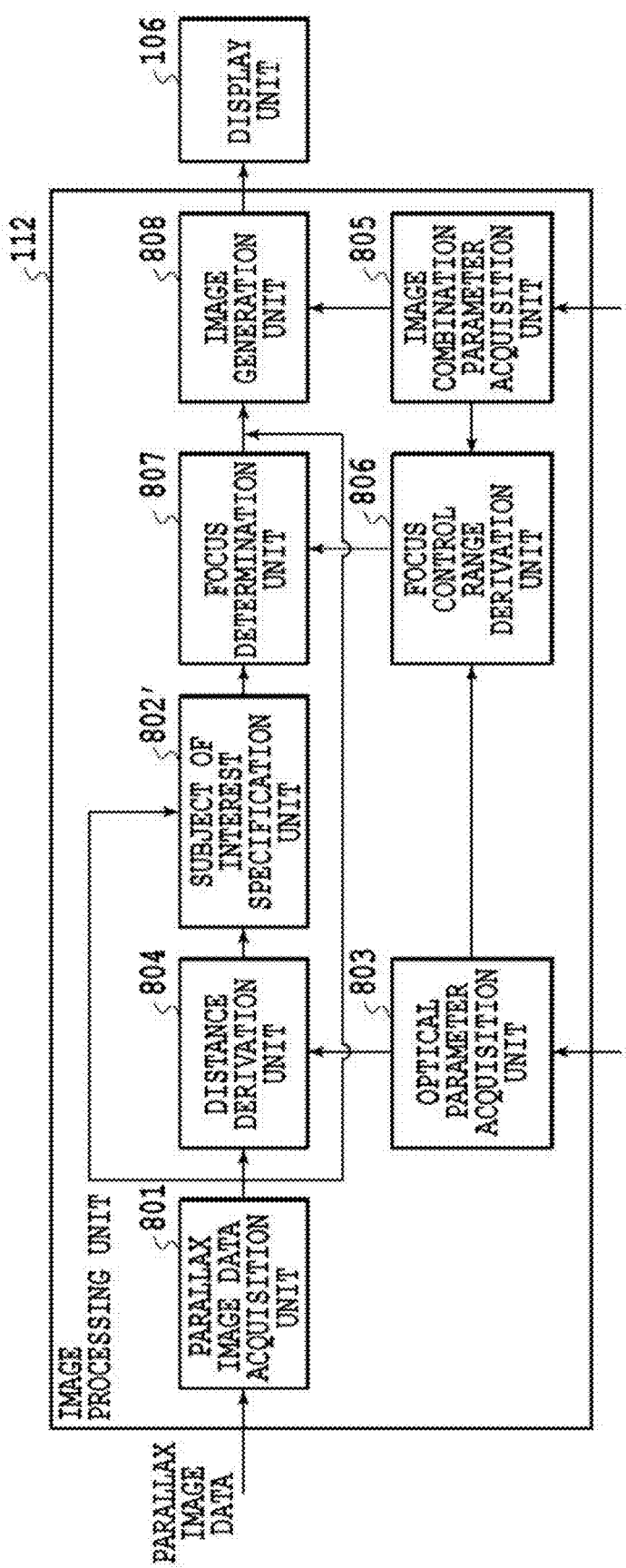
FIG. 14 is a block diagram showing an internal configuration of an image processing unit according to a second embodiment.

FIG. 14 is a block diagram showing an internal configuration of the image processing unit 112 according to the present embodiment. Compared with the image processing unit 112 of the first embodiment explained in FIG. 8, a subject of interest specification unit 802' is provided in place of the subject of interest specification unit 802.

The subject of interest specification unit 802' specifies a subject of interest in the same scene using distance information of the scene derived by the distance derivation unit 804 and parallax image data supplied from the parallax image data acquisition unit 801.

Other parts of the processing unit are basically the same as those of the image processing unit 112 of the first embodiment, however, the distance derivation unit 804 of the present embodiment slightly differs in deriving the distance of a subject space using acquired parallax image data etc. These minute different points are appropriately referred to in the explanation of a flowchart showing a flow of the image processing according to the present embodiment shown below.

Figure 15:
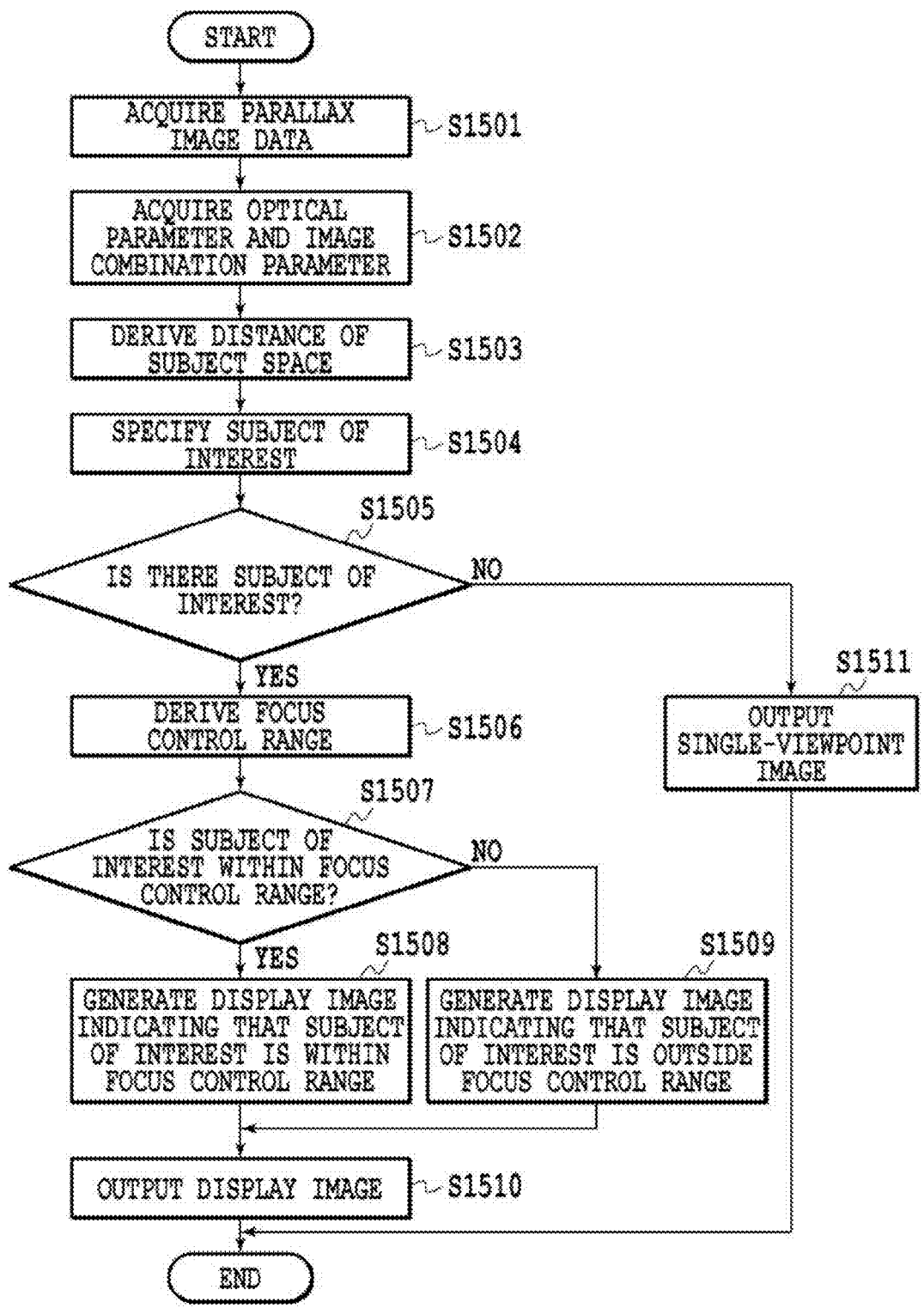
FIG. 15 is a flowchart showing a flow of processing in the image processing unit according to the second embodiment.

FIG. 15 is a flowchart showing a flow of the processing in the image processing unit 112 according to the present embodiment.

At step 1501, the parallax image data acquisition unit 801 acquires parallax image data acquired by the image capturing unit 100.

At step 1502, the optical parameter acquisition unit 803 and the image combination parameter acquisition unit 805 acquire optical parameters and image combination parameters, respectively.

At step 1503, the distance derivation unit 804 derives the distances of a subject space (distances of all the objects, such as a person and building, included in the scene) using parallax image data supplied from the parallax image data acquisition unit 801. As described above, in the present embodiment, distance information of the whole of the scene the image of which is captured is derived. The method for deriving distances is the same as that of the first embodiment, and therefore, explanation is omitted.

At step 1504, the subject of interest specification unit 802' specifies a subject of interest in the subject space. As the specification method, for example, mention is made of methods as follows.

1) Based on distance information about the whole of the scene supplied from the distance derivation unit 804, image areas having substantially the same distance are grouped and the grouped image area is specified as a subject of interest.

2) Areas in which a person, animal, plant, etc. exist are identified by applying a technique, such as face recognition, to the parallax image data and the identified person etc. is specified as a subject of interest.

3) A method using both 1) and 2) mentioned above.

4) Data of images of representative objects of interest, such as a person, animal, and plant, is prepared in advance as a template and a subject of interest is specified by pattern matching with the template.

5) Prior learning is performed as in a neural network and a subject of interest is specified by recognizing main objects using the learning result.

Specification of a subject of interest in the present embodiment can be implemented by applying a variety of publicly-known methods as mentioned in 1) to 5) described above.

At step 1505, the CPU 101 determines whether or not a subject of interest in the subject space is specified by the subject of interest specification unit 802' (whether or not a subject of interest exists). In the case where it is determined that there exists a subject of interest in the subject space, the procedure proceeds to step 1506. On the other hand, in the case where it is determined that there exists no subject of interest in the subject space, the procedure proceeds to step 1511.

At step 1506, the focus control range derivation unit 806 derives a focus control range in the case where image combination is performed on parallax images acquired at step 1501. The method for deriving a focus control range is the same as that of the first embodiment.

At step 1507, the focus determination unit 807 determines whether or not the subject of interest specified at step 1504 is within the focus control range derived at step 1506. The method for determining whether a subject of interest is within the focus control range is the same as that of the first embodiment. In the case where it is determined that the subject of interest is within the focus control range, the procedure proceeds to step 1508. On the other hand, in the case where it is determined that the subject of interest is not within the focus control range, the procedure proceeds to step 1509.

At step 1508, the image generation unit 808 generates a display image indicating that the subject of interest is within the focus control range.

At step 1509, the image generation unit 808 generates a display image indicating that the subject of interest is outside the focus control range.

Figure 16A:
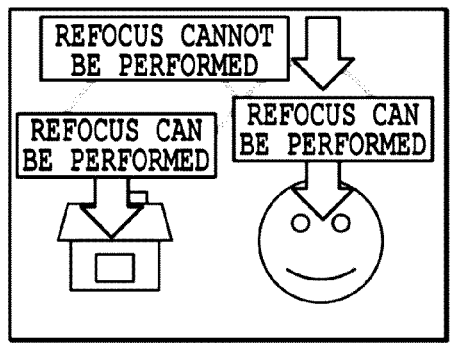
FIGS. 16A to 16C are each a diagram showing an example of a display image according to the second embodiment.
Figure 16B:
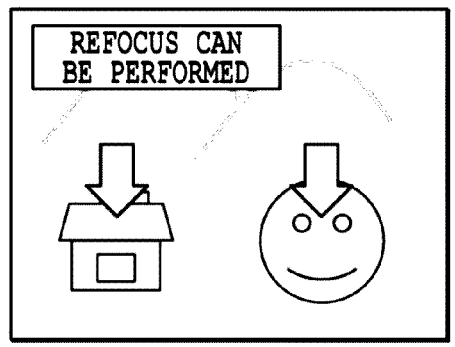
Figure 16C:
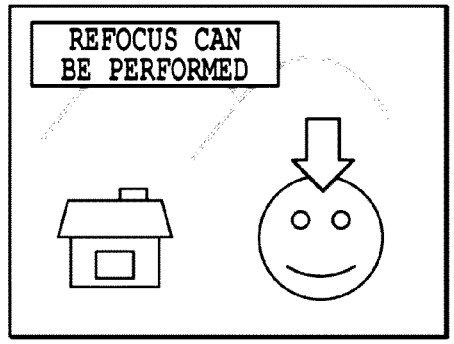

Here, an example of the display image generated at steps 1508 and 1509 is shown in each of FIGS. 16A to 16C. The positional relationship between the image capturing apparatus and the subjects, the distance between each subject and the image capturing apparatus, and the focus control range are the same as those in FIG. 12 of the first embodiment. FIGS. 16A to 16C each show an example of the display image in the case where the subjects A to C are specified as subjects of interest from the subject space. In FIG. 16A, a message indicating whether or not refocus can be performed is shown in an overlay display on the image (here, single-viewpoint image) for each of the subjects A to C. In FIG. 16B, a message that "Refocus can be performed" is shown in an overlay display for only the subjects A and B determined to be within the focus control range. On the other hand, in FIG. 16C, a message that "Refocus can be performed" is shown in an overlay display for only the subject A because only the subject A is determined to be within the focus control range. The display images are not limited to those based on the single-viewpoint image before image combination as in the first embodiment and may be those based on the combined image.

Explanation is returned to the flowchart in FIG. 15.

At step 1510, the image generation unit 808 outputs data of the display image generated at step 1508 or step 1509 to the display unit 106.

At step 1511, the image generation unit 808 outputs data of an arbitrary single-viewpoint image of the acquired parallax image data to the display unit 106. As in the first embodiment, it may also be possible to output a combined image obtained by combining a plurality of single-viewpoint images in place of the single-viewpoint image.

As explained above, according to the invention of the present embodiment, a subject of interest in the subject space is specified automatically. Then, whether or not focus control can be performed on the subject of interest specified automatically is determined automatically and the result is presented to a user. Due to this, it is made possible for the user to more easily know whether or not the subject within the image can be focused.

[Third Embodiment]

In the first embodiment and the second embodiment, the aspect is explained, in which whether or not the specified subject of interest is within the focus control range is determined and the result is notified to a user. Next, an aspect is explained as a third embodiment, in which the degree of achievement of focus control is represented by a numerical value and the degree is notified to a user. In the following the points peculiar to the present embodiment are explained mainly.

<Configuration Diagram of Image Processing Unit>

Figure 17:
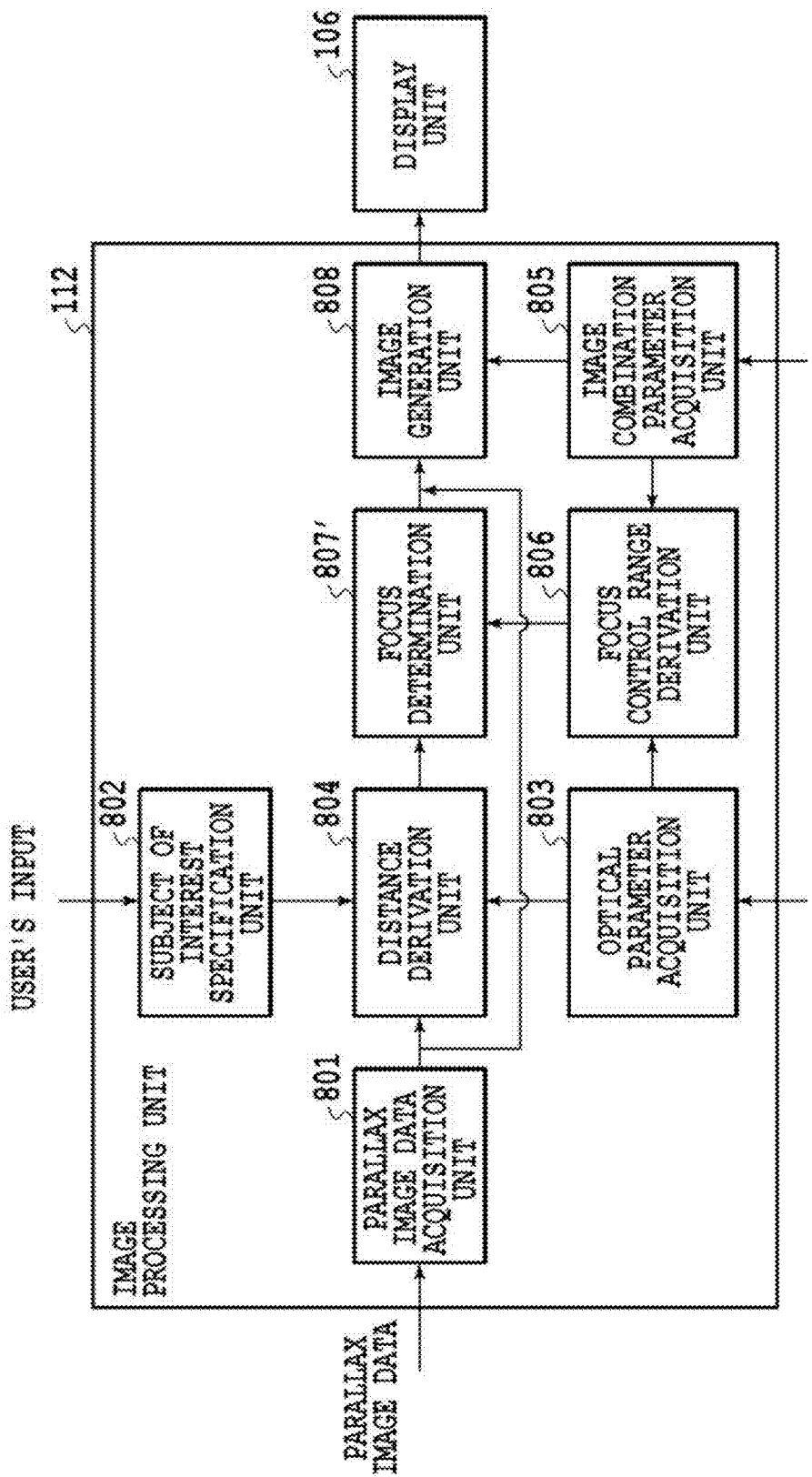
FIG. 17 is a block diagram showing an internal configuration of an image processing unit according to a third embodiment.

FIG. 17 is a block diagram showing an internal configuration of the image processing unit 112 according to the present embodiment. Compared with the image processing unit 112 of the first embodiment explained in FIG. 8, a focus determination unit 807' is provided in place of the focus determination unit 807.

The focus determination unit 807' compares the distance information of the subject of interest supplied from the distance derivation unit 804 with the focus control range supplied from the focus control range derivation unit 806 and quantitatively evaluates an extent to which focus control can be performed on the subject of interest. Due to this, it is made possible for a user not only to determine whether or not focus control can be performed but also to objectively grasp the focus level (degree of focused state) for all the subjects within and outside the focus control range.

Other parts of the processing unit are the same as those in FIG. 8 of the first embodiment, and therefore, explanation is omitted.

Figure 18:
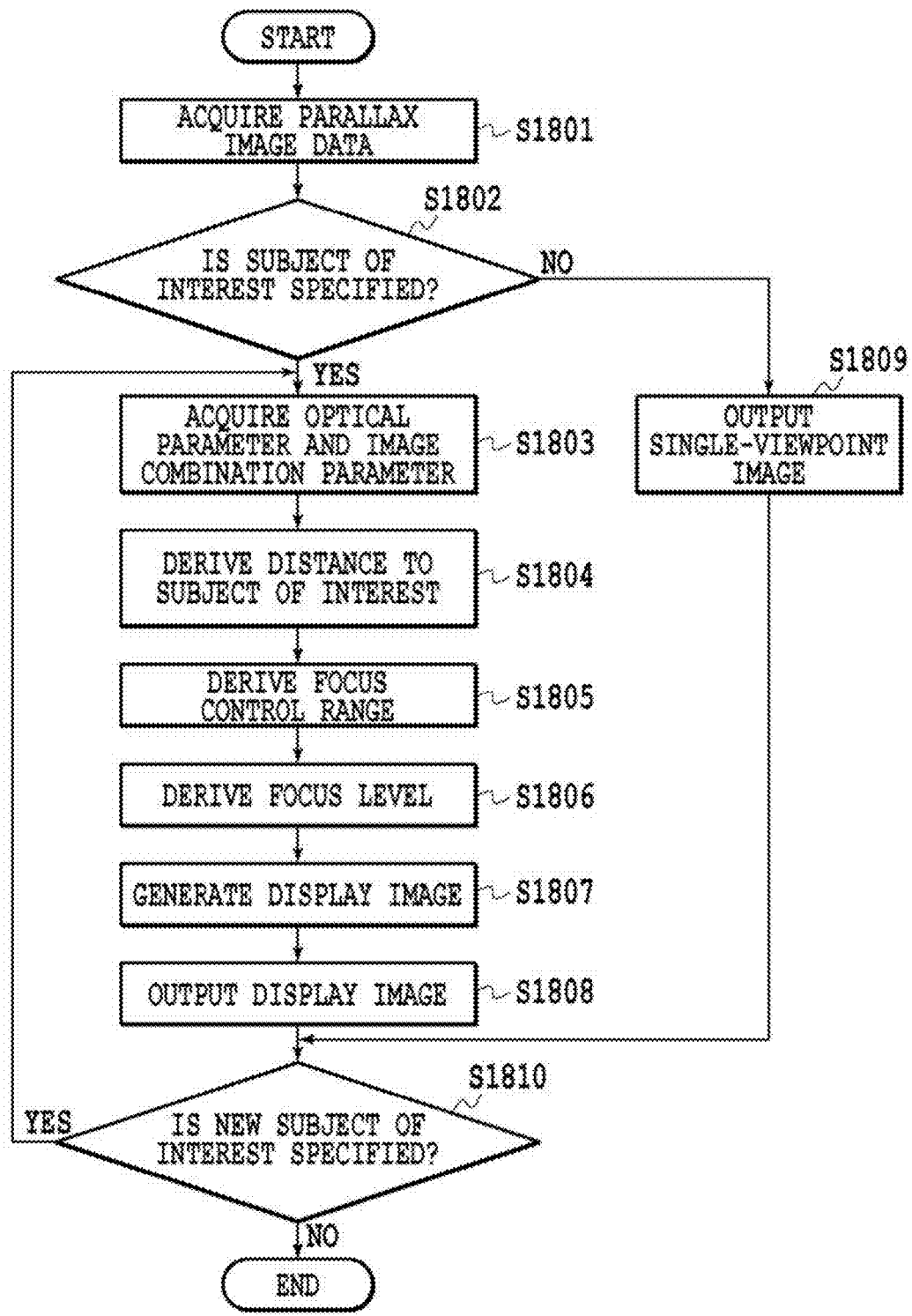
FIG. 18 is a flowchart showing a flow of processing in the image processing unit according to the third embodiment.

FIG. 18 is a flowchart showing a flow of the processing in the image processing unit 112 according to the present embodiment.

The processing at step 1801 to step 1805 is the same as that at step 901 to step 905 in the flowchart in FIG. 9 of the first embodiment, and therefore, explanation is omitted.

At step 1806, the focus determination unit 807' quantitatively evaluates the degree of focused state of the subject of interest using the information of distance to the subject of interest supplied from the distance derivation unit 804 and the focus control range supplied from the focus control range derivation unit 806. Specifically, an evaluated value $E_{obj}$ of the focus control in the case where the subject of interest is in a position at the distance $D_{obj}$ from the image capturing apparatus is derived using expression (10) to expression (12) below.

$$E_{obj} = \frac{D_{far} - D_{obj}}{D_{far} - D_{refocus}}(D_{focus} \leq D_{obj} \leq D_{far}) \quad \text{Expression (10)}$$

$$E_{obj} = \frac{D_{obj} - D_{near}}{D_{refocus} - D_{near}}(D_{near} \leq D_{obj} < D_{focus}) \quad \text{Expression (11)}$$

$$E_{obj} = 0 \quad \text{Expression (12)}$$

Figure 19:
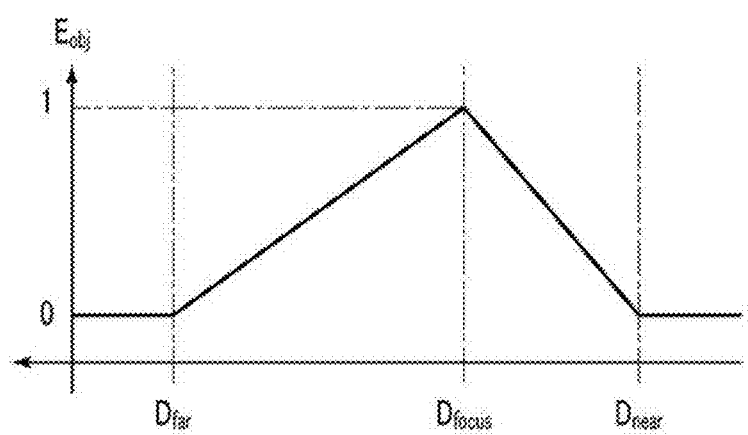
FIG. 19 is a diagram showing a relationship between an evaluated value $E_{obj}$ and a position of a subject of interest.

At this time, the evaluated value $E_{obj}$ is derived using the expression (10) in the case where the position of the subject of interest is within the back focus control range and using the expression (11) in the case where the position of the subject of interest is within the front focus control range (see FIG. 11 described previously). Then, in the case where the position of the subject of interest is not included in the object side focus control range $D_{refocus}$, the evaluated value $E_{obj}$ is derived using the expression (12). FIG. 19 shows a relationship between the evaluated value $E_{obj}$ derived using the expression (10) to expression (12) described above and the position of the subject of interest. It is known that the evaluated value $E_{obj}$ becomes 1 in the position where the position of the subject of interest overlaps the subject surface and gradually reduces from 1 as the position of the subject of interest becomes more distant from the subject surface and becomes 0 in the position where the position of the subject of interest is beyond the focus control range. In this manner, the degree of focused state is derived quantitatively as a continuous evaluated value for a certain subject within the focus control range.

Explanation is returned to the flowchart in FIG. 18.

Figure 20A:
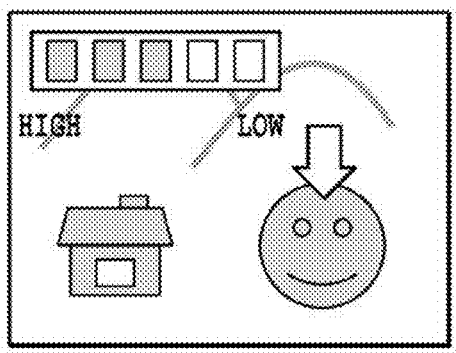
FIGS. 20A to 20C are each a diagram showing an example of a display image according to the third embodiment.
Figure 20B:
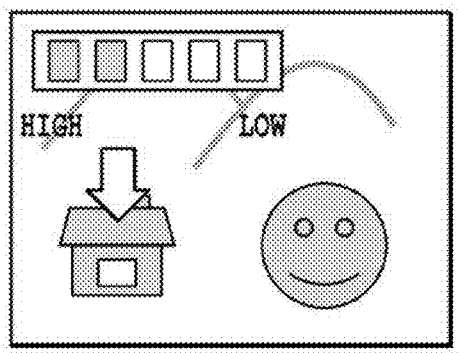
Figure 20C:
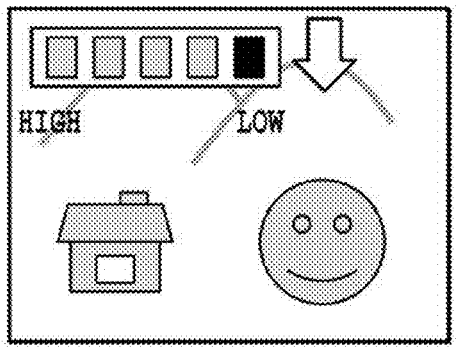
Figure 21:
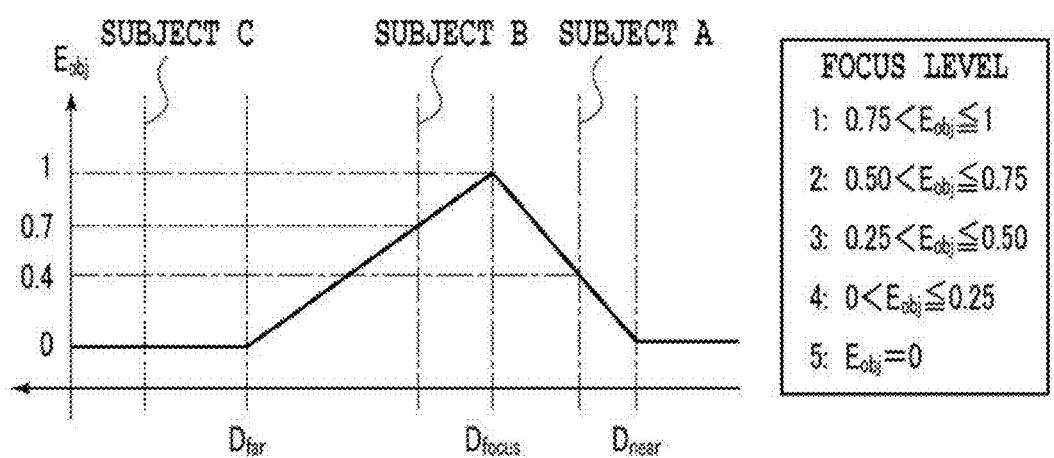
FIG. 21 is a diagram for explaining the way the focus level is classified into grades according to the evaluated value.

At step 1807, the image generation unit 808 generates a display image quantitatively indicating the degree of focused state of a certain subject of interest within the focus control range based on the evaluated value $E_{obj}$ derived at step 1806. FIGS. 20A to 20C are each an example of the display image generated in the present embodiment and each shows an example of the display image in the case where each of the subjects A to C is selected by a user as a subject of interest in the positional relationship between the image capturing apparatus and the subject in FIG. 12 described previously. In each display image of FIGS. 20A to 20C, the focus level for the subject of interest is shown at the upper-left of the screen by a level bar representing the focus level in five grades in accordance with the evaluated value $E_{obj}$. FIG. 21 is a diagram for explaining how the focus level is classified into five grades in accordance the evaluated value $E_{obj}$ for the subjects A to C. In the present embodiment, the larger value of the focus level indicates the lower degree of focused state at the time of performing focus control. The focus level is classified as follows. In the case where $E_{obj}=0$, the level is 5, where $0<E_{obj}\leq0.25$, the level is 4, where $0.25<E_{obj}\leq0.50$, the level is 3, where $0.50<E_{obj}\leq0.75$, the level is 2, and where $0.75<E_{obj}\leq1.0$, the level is 1. In FIG. 21, the evaluated value $E_{obj}$ for the subject A is 0.4, and therefore, the focus level is 3 and in the display image in FIG. 20A, the scale of the level bar indicates 3. Similarly, the evaluated value $E_{obj}$ for the subject B is 0.7, and therefore, the focus level is 2 and in the display image in FIG. 20B, the scale of the level bar indicates 2. Then, the evaluated value $E_{obj}$ for the subject C outside the focus control range is 0, and therefore, the focus level is 5 and in the display image in FIG. 20C, the scale of the level bar indicates 5. In the present embodiment, the degree of focused state is indicated by the focus level in five grades, however, the method for indicating the degree of focused state is not limited to this. For example, it may also be possible to display the evaluated value (0 to 1.0) derived at step 1806 as it is. Further, the method for deriving the evaluated value indicating the degree of focused state is not limited to the method that uses the expression (10) to expression (12) described above and any method capable of quantitatively evaluating the degree of focused state may be accepted.

Explanation is returned to the flowchart in FIG. 18.

At step 1808, the image generation unit 808 outputs data of the display image generated at step 1807 to the display unit 106.

At step 1809, the parallax image data acquisition unit 801 outputs data of an arbitrary single-viewpoint image of the acquired parallax image data to the display unit 106.

At step 1810, the CPU 101 determines whether a new subject of interest is specified by the subject of interest specification unit 802. In the case where a new subject of interest is specified, the procedure returns to step 1803 and the series of the processing at step 1803 to step 1810 is repeated. On the other hand, in the case where no new subject of interest is specified, the present processing is exited.

In the present embodiment, by displaying the display image as shown in FIGS. 20A to 20C in the display unit of the image capturing apparatus, notification of the degree of achievement of focus control for the subject of interest specified by a user is made. However, the notification method is not limited to this. For example, it may also be possible to display the degree of achievement of focus control for the subject of interest specified by a user in a display device (for example, a display etc. prepared separately from the image capturing apparatus and used at the time of editing a parallax image) connected to the image capturing apparatus. Alternatively, it may also be possible to simultaneously make notification by a method using audio, vibration, light, etc., other than the display or to use the method in place of the above-mentioned method. In the case such as this, it may also be possible to make notification of the degree of achievement of focus control in association with the magnitude of the output of voice, vibration, and light.

As in the first embodiment, in the present embodiment, explanation is given by premising the aspect in which the subject of interest is specified in accordance with the user's input via the operation unit 105, however, it may also possible to apply the present embodiment to the aspect in which the subject of interest is specified automatically, for example, as in the second embodiment.

As explained above, according to the present embodiment, the degree of focused state for the specified subject of interest is indicated, and therefore, it is possible for a user to know more accurate information about focus control.

[Fourth Embodiment]

In the first to third embodiments, explanation is given by premising the image capturing apparatus having the image capturing unit with the configuration shown in FIG. 2. Next, an aspect that premises an image capturing apparatus having the image capturing unit with the configuration shown in FIG. 3 and FIG. 4 is explained as a fourth embodiment. In the following, the points peculiar to the present embodiment are explained mainly.

With the configuration shown in FIG. 3 and FIG. 4, data of a parallax image in which small images from different image capturing viewpoints and with different image capturing ranges are arranged side by side is acquired by the image sensing element 204. In the configuration in FIG. 3, the lens array is arranged between the image forming optical system and the image side conjugate surface (left side of the image side conjugate surface), however, the configuration in FIG. 4 differs from that in FIG. 3 in that the lens array is arranged outside (right side of the image side conjugate surface), not between the image forming optical system and the image side conjugate surface. Because of this, in the case of the configuration in FIG. 4, the lens array 203 regards the image formed by the image forming optical system 202 as a real object and forms an image again on the image sensing element 204. However, in both the configurations, the lens array 203 regards the image formed by the image forming optical system 202 as an object and forms an image of the object on the image sensing element 204, and therefore, both the configurations are the same essentially. In the following, the configuration in FIG. 3 is explained as an example, however, the contents of the explanation also apply to the configuration in FIG. 4.

First, image combination (refocus) processing in the present embodiment is explained.

Qualitatively, the processing is similar to that in the first embodiment and in the processing, images of divided pupils of the image forming optical system 202 are superimposed on one another with the amount of shift corresponding to the distance of the subject desired to be focused.

Figure 22A:
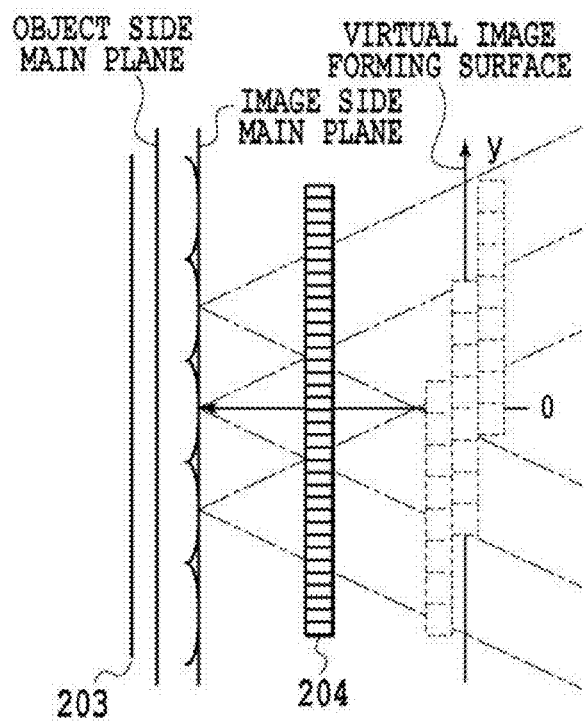
FIGS. 22A and 22B are each an enlarged view of the periphery of a lens array in the configuration of the image capturing unit shown in FIG. 3.
Figure 22B:
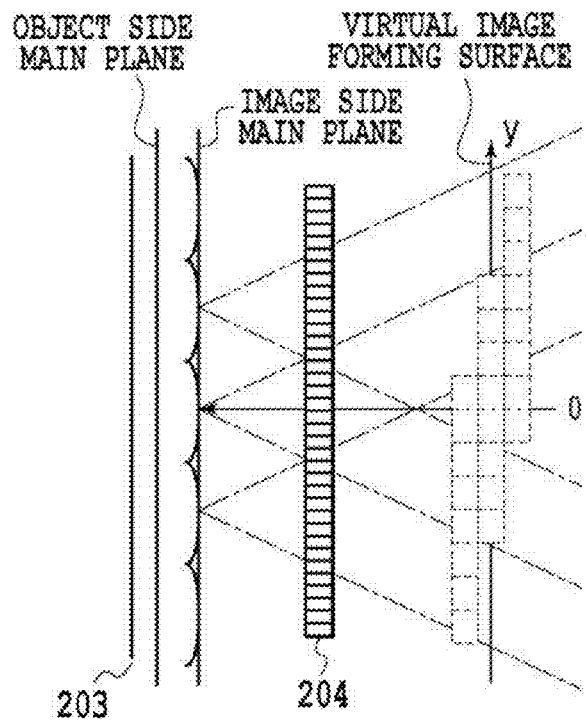

FIG. 22 is an enlarged view of the portion of the lens array 203 and the image sensing element 204 as a main portion in the configuration in FIG. 3. In the present embodiment, the lens array 203 is configured by microlenses whose surface on the object side is flat and whose surface on the image side is convex. Of course, the shape of the lens array 203 is not limited to this. In FIG. 22, the alternate long and short dash line represents the angle of field of each microlens. By projecting pixel values obtained by the image sensing element 204 onto a virtual image forming surface via the microlens corresponding to each pixel and combining them, it is possible to generate a combined image in focus on the virtual image forming surface. Here, the virtual image forming surface refers to a surface conjugate with the surface on the side of the object desired to be focused by image combination (surface conjugate via the image forming optical system 202). For example, in order to generate an image in focus on the subject surface 201 in FIG. 3, a virtual image forming surface is set to the image side conjugate surface 301. In FIG. 22, for easier understanding, the pixels projected at the time of combined image generation are represented by the broken line being shifted in units of angle of field of each microlens. It may also be possible to generate a combined image by a method for combining images by translating each pixel as long as the pixels are superimposed on one another in the same way as that by the above-described method (combination method in which the pixel values obtained by the image sensing element 204 are projected onto a virtual image forming surface via the microlens corresponding to each pixel). At this time, in the case where the area of the lens array 203 through which the luminous flux incident on pixels has passed is the same, the amount of translation of the pixels is the same. That is, the operation of the pixel at the time of combined image generation in FIG. 3 and FIG. 4 is determined in accordance with the area of the lens array 203 through which the luminous flux incident on pixels has passed.

Next, the focus control range in the present embodiment is explained.

Figure 23:
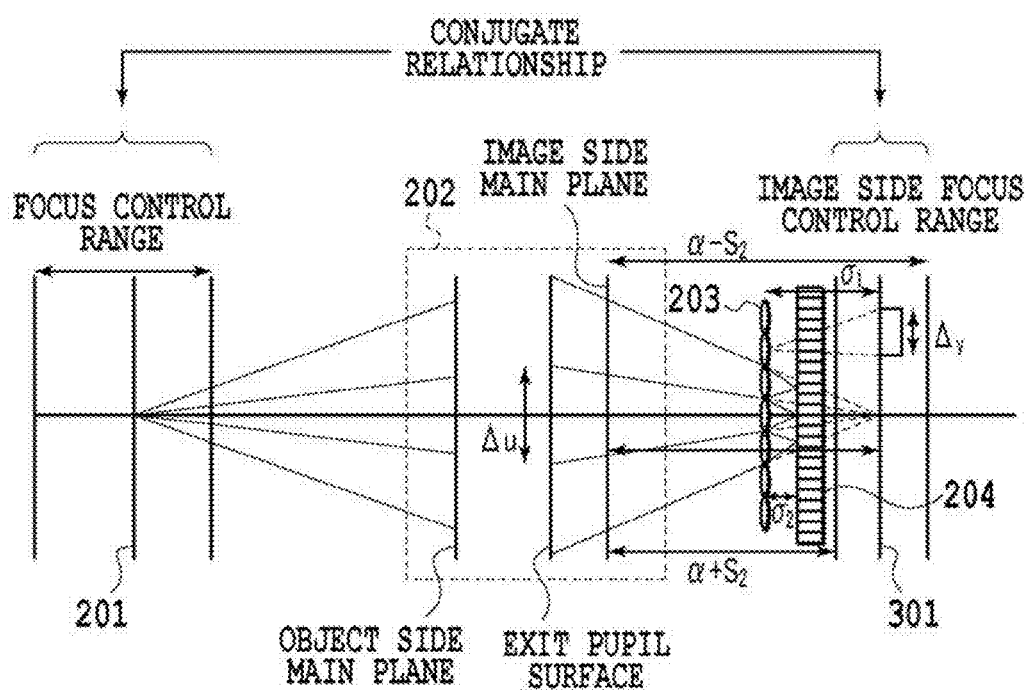
FIG. 23 is a diagram showing a relationship between an image side focus control range and an object side focus control range according to a fourth embodiment.

The focus control range in the present embodiment is also described by the same expression (1) as in the first embodiment. That is, the range (range conjugate with respect to the image forming optical system 202) conjugate with the refocus range $\alpha_+s_2$ to $\alpha_-s_2$ on the image side expressed using the expression (1) described previously is the focus control range, which is the refocus range on the object side. FIG. 23 is a diagram corresponding to FIG. 7 according to the first embodiment. $\Delta y$ in FIG. 23 represents the sampling pitch of the two-dimensional intensity distribution of light and $\Delta y = \Delta \sigma_1 / \sigma_2$ holds ($\sigma_1$: interval between the image side conjugate surface 301 and the object side main plane of the lens array 203, $\sigma_2$: interval between the image side main plane of the lens array 203 and the image sensing element 204). This is because the lens array 203 regards the image formed by the image forming optical system 202 as a virtual object, and therefore, forms a reduced image on the image sensing element 204 with a magnification of $\sigma_2/\sigma_1$. Then, in the present embodiment also, the expression (1) can be approximated as the expression (2) because $\Delta \ll P$ (P: exit pupil distance of the image forming optical system 202).

The flow of the processing in the image processing unit 112 according to the present embodiment is the same as that in the flowchart in FIG. 9 according to the first embodiment, however, the configuration of the image capturing unit 100 is different, and therefore, the focus control range is derived as follows (step 905).

As is obvious from FIG. 23, $NF = \sigma_1/\Delta_{LA}$ and $\Delta y = \Delta \sigma_1 / \sigma_2$ hold in terms of geometry, and therefore, expression (13) below holds.

$$R_{mono} = \left(\frac{\sigma_2}{\sigma_1}\right)^2 R_{total} \qquad \text{Expression (13)}$$

From the expression (13) etc., conditional expression (14) that the image side focus control range $d_{refocus}$ in the present embodiment should satisfy is found.

$$-10.0 \leq \frac{\Delta_{LA} d_{refocus}}{\Delta \sigma_1} \sqrt{\frac{R_{synth}}{R_{total}}} \leq 10.0 \qquad \text{Expression (14)}$$

As in the first embodiment, by replacing the range, which is ±10.0 in the above conditional expression (14), with ±6.0 or ±3.0, it is possible to obtain a clearer combined image.

In the following, specific examples are shown.
Number $R_{total}$ of effective pixels of the image sensing element 204: $150.0 \times 10^6$ (pix)
$\sigma_1$: 0.3712 (mm)
$\sigma_2$: 0.0740 (mm)
Pixel pitch $\Delta$ of the image sensing element 204: 0.0024 (mm)
Pitch $\Delta_{LA}$ of the lens array 203: 0.0256 (mm)
Focal length $f_W$ at the wide-angle end of the image forming optical system 202: 72.2 (mm)
Focal length $f_T$ at the telephoto end of the image forming optical system 202: 194.0 (mm)
F-number (from the wide-angle end to the telephoto end): 2.9
Number N of one-dimensionally divided pupils: 5
Resolution $R_{mono}$ per single-viewpoint image: $6.0 \times 10^6$ pix
The range of the conditional expression (14), the resolution $R_{comb}$ of the combined image corresponding to each range expressed by the conditional expression (14), and $d_{refocus}$ corresponding to each resolution of the combined image are, for example, as follows shown in Table (2) below.

TABLE 2

| | Range of Expression (14) | | |
|---|---|---|---|
| | ±2.6 | ±5.7 | ±9.8 |
| $R_{comb}$ | $10.0 \times 10^6$ pix | $6.0 \times 10^6$ pix | $3.0 \times 10^6$ pix |
| $d_{refocus}$ | 0.6398 (mm) | 0.9918 (mm) | 1.3208 (mm) |

As in the first embodiment, by a user's input via the operation unit 105, the resolution $R_{comb}$ of the combined image is selected, for example, from among the above-mentioned three kinds.

In the above-mentioned example, in order to generate a combined image of, for example, $10.0 \times 10^6$ pix, the resolution $R_{mono}$ per single-viewpoint image is $6.0 \times 10^6$ pix, and therefore, it is known that it is necessary to increase the resolution by the super-resolution by pixel shifting etc.

[Fifth Embodiment]

Next, an aspect that premises an image capturing apparatus having an image capturing unit with the configuration (camera array) shown in FIG. 5 is explained as a fifth embodiment. In the following, the points peculiar to the present embodiment are explained mainly.

Figure 24:
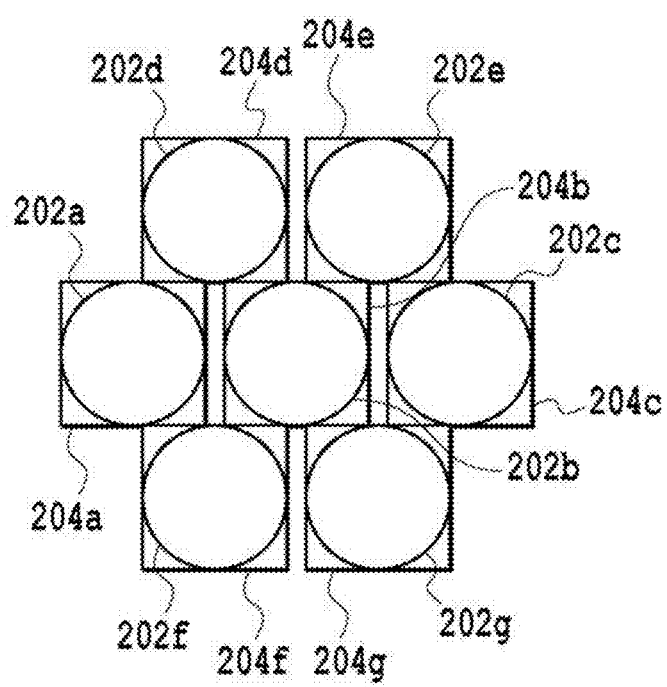
FIG. 24 is a diagram of the image capturing unit shown in FIG. 5 in the case where it is viewed from the front (object side)

FIG. 24 is a diagram of the image capturing unit 100 having the configuration of the camera array in FIG. 5 according to the present embodiment in the case where the image capturing unit 100 is viewed from the front (object side) and an arrangement of image forming optical systems 202a to 202g and image sensing elements 204a to 204g in each of seven image capturing modules is shown. In the case of the image capturing unit 100, the camera array has hexagonal symmetry with an optical axis of the image forming optical system 202b as an axis of rotation. However, the configuration of the camera array is not limited to this and the number and array of the image forming optical systems are arbitrary. Further, each of the image sensing elements 204a to 204g is arrayed in correspondence to each of the image forming optical systems 202a to 202g, however, in the case where it is possible to acquire the image formed by each of the image forming optical systems 202a to 202g, the number of image sensing elements may be one.

In the image capturing unit 100 with the configuration shown in FIG. 24, the light ray refracted by each of the image forming optical systems 202a to 202g is received by each of the image sensing elements 204a to 204g corresponding thereto. A plurality of images acquired by the image sensing elements 204a to 204g are parallax images of a subject space observed from different viewpoints. By performing image combination using the plurality of parallax images, it is possible to obtain the light field of the subject space.

Figure 25:
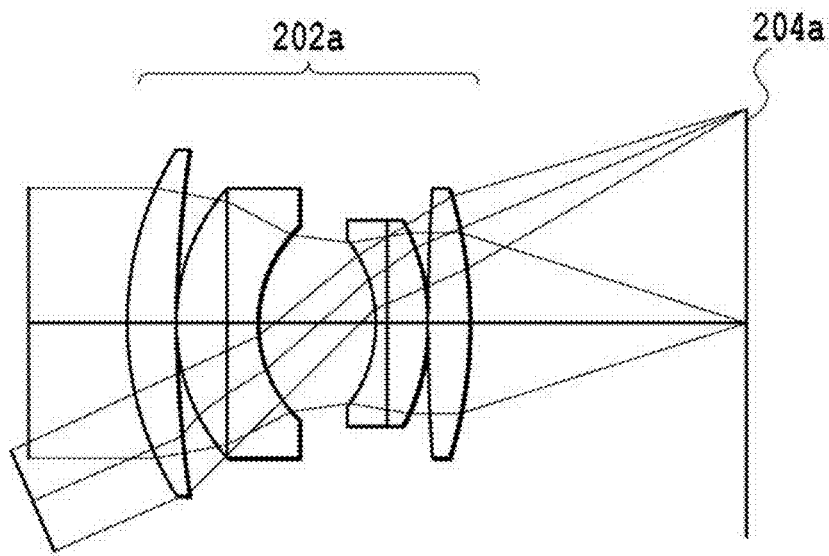
FIG. 25 is a diagram of an image forming optical system and an image sensing element in the image capturing unit shown in FIG. 5 in the case where they are viewed from the side.

FIG. 25 is a diagram (sectional view) of the image forming optical system 202a and the image sensing element 204a viewed from the side. The other image forming optical systems 202b to 202g and image sensing elements 204b to 204 are the same, however, the configuration of each image forming optical system may differ from one another. The image forming optical system 202a is a single focus lens and performs refocus by changing the interval between the image forming optical system 202a and the image sensing element 204a.

Figure 26:
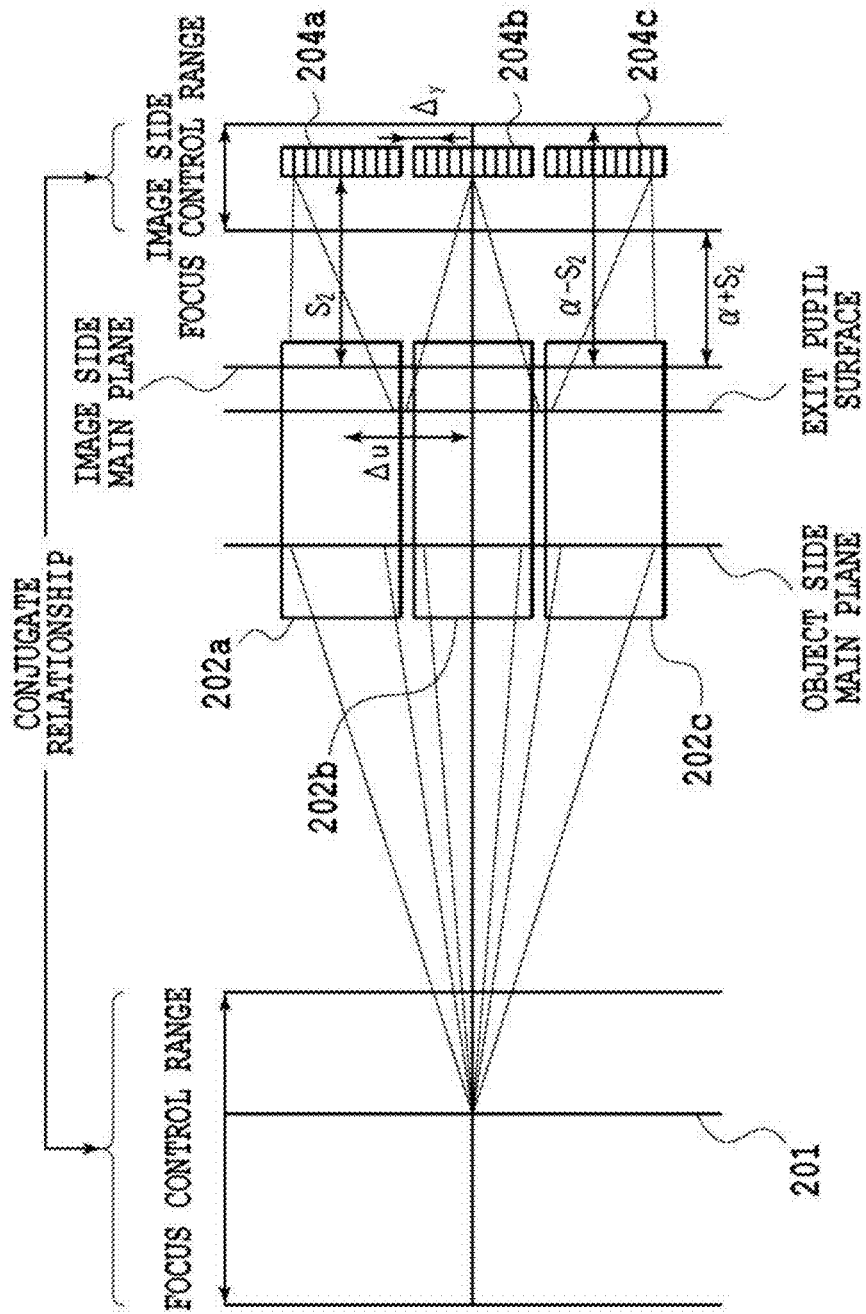
FIG. 26 is a diagram showing a relationship between an image side focus control range and an object side focus control range according to a fifth embodiment.

As in the first embodiment, in the image combination processing in the present embodiment also, the image from each viewpoint is superimposed on one another with the amount of shift corresponding to the distance of the subject desired be focused. The focus control range is also the same as that expressed by the expression (1) described previously. FIG. 26 is a diagram corresponding to FIG. 7 of the first embodiment, and in the case of the present embodiment, $\Delta y = \Delta$, and $\Delta u = P_{mono}/F_{mono}$ hold. Here, $F_{mono}$ represents the F-number in each of the image forming optical systems 202a to 202g and $P_{mono}$ represents the exit pupil distance corresponding to each image forming optical system. Then, in the present embodiment, $\Delta \ll P_{mono}$, and therefore, the expression (1) can be approximated as expression (15) below.

$$\alpha_{\pm} s_2 = s_2 \mp F_{mono} \Delta y = s_2 \mp F_{mono} \Delta \qquad \text{Expression (15)}$$

The flow of the processing in the image processing unit 112 according to the present embodiment is the same as that in the flowchart in FIG. 9 according to the first embodiment, however, the configuration of the image capturing unit 100 is different, and therefore, the focus control range is derived as follows (step 903 and step 905).

In the case of the present embodiment, each of the image forming optical systems 202a to 202g configuring the image capturing unit 100 has an aperture the f-stop of which is variable. Because of this, at step 903, the f-stop of each image forming optical system at the time of image capturing is acquired as an optical parameter.

At step 905, based on the same concept as that of the first embodiment, the F-number of each of the image forming optical systems 202a to 202g at the time of image capturing obtained at step 903 is substituted for $F_{mono}$ and the focus control range is derived. Here, by taking the resolution of the image formed by the image forming optical system having the F-number of $F_{mono}$ to be $R_{mono}$, conditional expression (16) that $d_{refocus}$ should satisfy is found.

$$-10.0 \le \frac{d_{refocus}}{F_{mono} \Delta} \sqrt{\frac{R_{comp}}{R_{mono}}} \le 10.0 \qquad \text{Expression (16)}$$

As in the first embodiment, by replacing the range, which is ±10.0 in the above-mentioned conditional expression (16), with ±6.0 or ±3.0, it is possible to obtain a clearer combined image.

In the following, specific examples are shown.
Number $R_{mono}$ of effective pixels of each of the image sensing elements 204a to 204g: $19.3 \times 10^6$ (pix)

Pixel pitch Δ: 0.0012 (mm)
Focal length f of each of the image forming optical systems 202a to 202g: 50.0 (mm)
F-number ($F_{mono}$): 1.8
The range of the conditional expression (16), the resolution $R_{comb}$ of the combined image corresponding to each range expressed by the conditional expression (16), and $d_{refocus}$ corresponding to each resolution of the combined image are, for example, as shown in Table (3) below.

TABLE 3

| | Range of Expression (16) | | |
|---|---|---|---|
| | ±2.8 | ±5.7 | ±9.9 |
| $R_{comb}$ | 19.3 × 10⁶ pix | 10.0 × 10⁶ pix | 5.0 × 10⁶ pix |
| $d_{refocus}$ | 0.0060 (mm) | 0.0171 (mm) | 0.2904 (mm) |

Then, as in the first embodiment, by a user's input via the operation unit 105, the resolution $R_{comb}$ of the combined image is selected, for example, from among the above-mentioned three kinds.

In the case where the F-number at the time of image capturing is a different one, $d_{refocus}$ is determined so as to satisfy the conditional expression (16).

[Sixth Embodiment]

The first to fifth embodiments are the aspects in which whether or not focus control can be performed is determined for the subject of interest specified by a user in the state where the optical parameters are fixed or in the state where the distance between the image capturing apparatus and the subject of interest is fixed, and then the determination result is notified to the user. Next, an aspect is explained as a sixth embodiment, in which in the case where image capturing is performed continuously for a fixed period of time, such as photographing of moving images, the optical parameters change or the positional relationship between the image capturing apparatus and the subject of interest changes during the period of image capturing. The parts same as those in the first embodiment etc. is simplified or omitted in the explanation and in the following, the points peculiar to the present embodiment are explained mainly.

<Configuration Diagram of Image Processing Unit>

Figure 27:
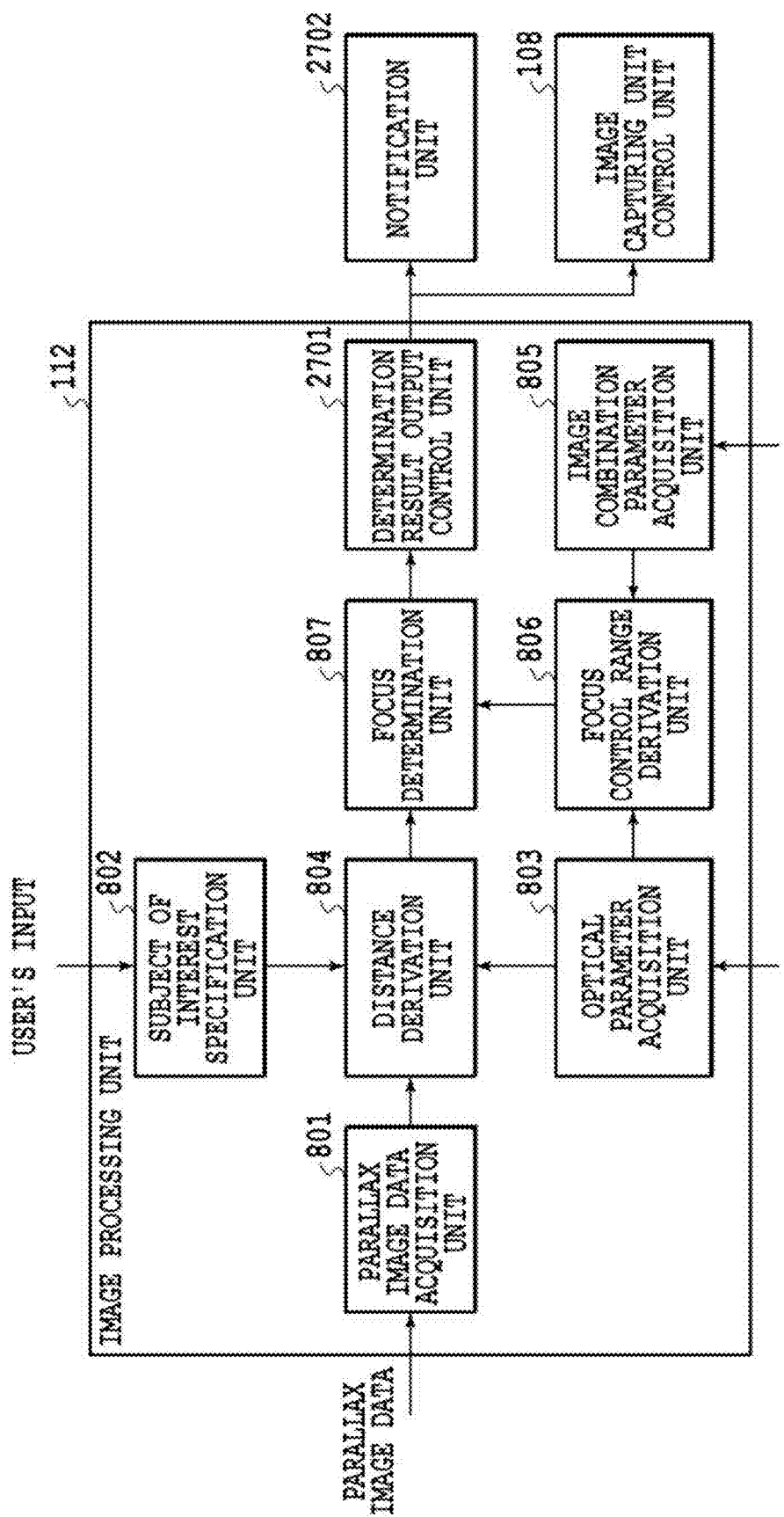
FIG. 27 is a block diagram showing an internal configuration of an image processing unit according to a sixth embodiment.

FIG. 27 is a block diagram showing an internal configuration of the image processing unit 112 according to the present embodiment. Compared with the image processing unit 112 according to the first embodiment (see FIG. 8 described previously), a determination result output control unit 2701 is provided in place of the image generation unit 808. Then, as an output destination of the determination result output control unit 2701, a notification unit 2702 and the image capturing unit control unit 108 are shown.

The determination result output control unit 2701 outputs information in which the determination result of the focus determination unit 807 is reflected (information indicative of the focused state of the specified subject of interest, hereinafter, "focused state information") to the notification unit 2702 and the image capturing unit control unit 108.

The notification unit 2702 having received the focused state information from the determination result output control unit 2701 notifies the contents thereof to a user by the various methods described previously (any of voice, vibration, and light, or a combination thereof). Of course, it is also possible to make notification by a combination with the display of the display image indicative of the focused state of the subject of interest explained in the embodiments hitherto. In this case, the image generation unit 808 is provided as in the case of the first embodiment etc.

The image capturing unit control unit 108 continues or exits the image capturing processing (acquisition of parallax image data) based on the received information of the focused state of the subject of interest (or instructions from a user given triggered by the information).

Other processing units are basically the same as those of the image processing unit 112 in the first embodiment, however, there are slight differences, such as that, for example, the parallax image data acquisition unit 801 and the optical parameter acquisition unit 803 in the present embodiment continuously operate during the period of image capturing. These slight differences are referred to appropriately in the explanation of a flowchart showing a flow of image processing according to the present embodiment shown below.

Figure 28:
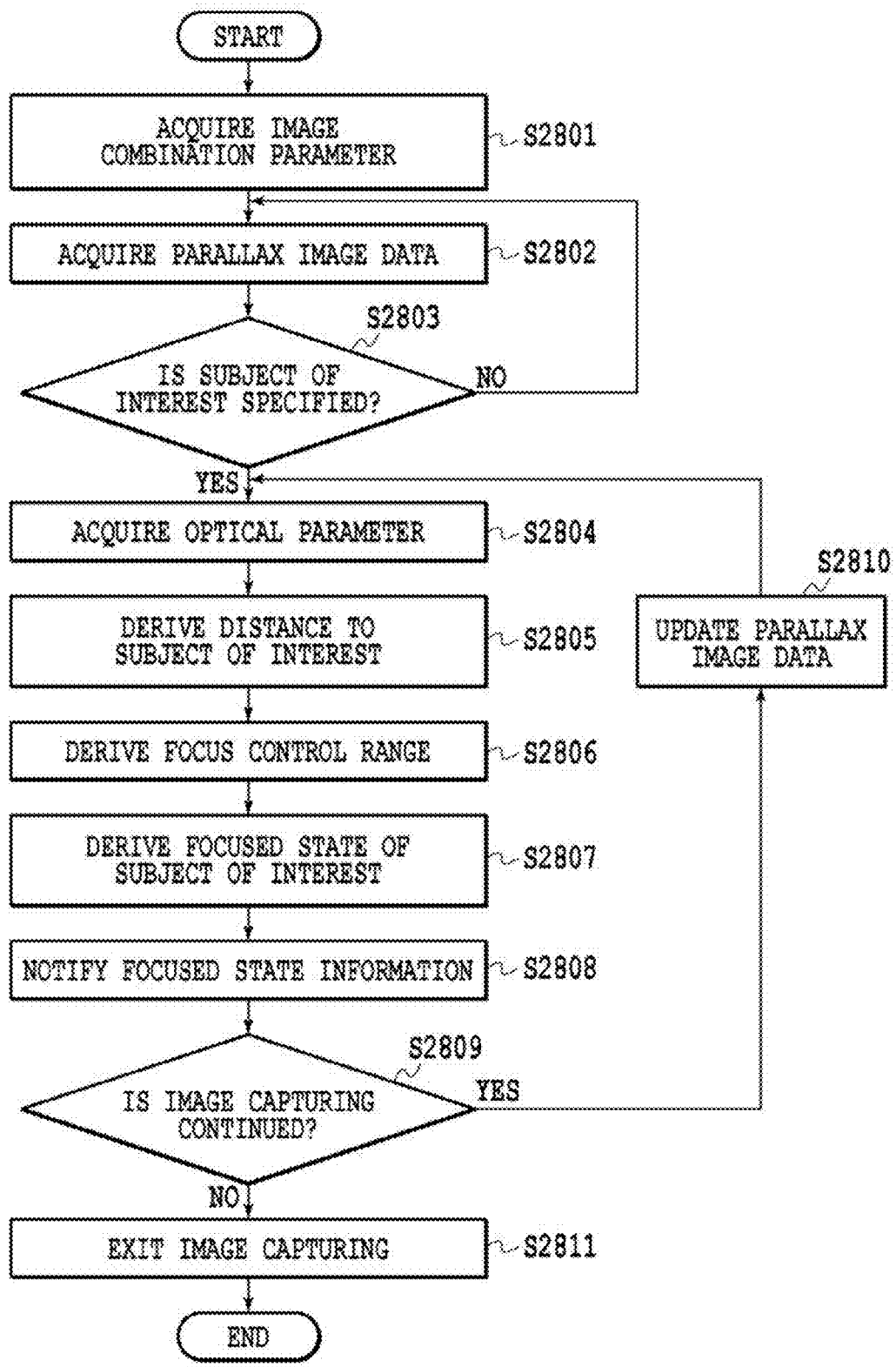
FIG. 28 is a flowchart showing a flow of processing in the image processing unit according to the sixth embodiment.

FIG. 28 is a flowchart showing a flow of processing in the image processing unit 112 according to the present embodiment.

At step 2801, the image combination parameter acquisition unit 805 acquires image combination parameters.

At step 2802, the parallax image data acquisition unit 801 acquires the parallax image data acquired by the image capturing unit 100.

At step 2803, the CPU 101 determines whether a subject of interest in accordance with a user's input is specified in the subject of interest specification unit 802. In the case where a subject of interest is specified, the procedure proceeds to step 2804. On the other hand, in the case where no subject of interest is specified, the procedure returns to step 2802.

At step 2804, the optical parameter acquisition unit 803 acquires optical parameters.

At step 2805, the distance derivation unit 804 derives the distances of a subject space (distances of all the objects, such as a person and building, included in the scene) using parallax image data supplied from the parallax image data acquisition unit 801. As described above, in the present embodiment, distance information of the whole of the scene the image of which is captured is derived. The method for deriving distances is the same as that of the first embodiment, and therefore, explanation is omitted.

At step 2806, the focus control range derivation unit 806 derives a focus control range in the case where image combination is performed on parallax images acquired at step 2802 or newly acquired at step 2810, to be described later. The method for deriving a focus control range is the same as that of the first embodiment.

At step 2807, the focus determination unit 807 derives the focused state of the subject of interest specified at step 2803. For example, whether or not the subject of interest is within the focus control range derived at step 2806 is determined. The method for determining whether the subject of interest is within the focus control range is the same as that of the first embodiment. The information of the derived focused state is output to the notification unit 2702 and/or the image capturing unit control unit 108 by the determination result output control unit 2701.

At step 2808, the notification unit 2702 notifies the contents of the received focused state information to the user by the various methods as described previously.

At step 2809, the CPU 101 determines whether or not to exit acquisition (image capturing) of parallax image data based on the focused state information output from the determination result output control unit 2701 and gives instructions to continue or exit image capturing to the image capturing unit control unit 108. For example, it is supposed that in the case where the subject of interest is within the focus control range, instructions to continue image capturing are given and in the case where the subject of interest is outside the focus control range, instructions to exit image capturing (or recording of captured image data) are given. In addition to the above, it may also be possible to determine whether to continue image capturing in accordance with input instructions of a user by a configuration in which it is possible for the user to select whether to continue image capturing. In the case where it is determined that image capturing is continued (or in the case where the user gives instructions to continue image capturing), the step proceeds to step 2810. On the other hand, in the case where it is determined that image capturing is exited (or in the case where the user gives instructions to exit image capturing), the procedure proceeds to step 2811.

At step 2810, the image capturing unit control unit 108 continues image capturing (or recording of captured image data) and new parallax image data is acquired by the parallax image data acquisition unit 801 (update of parallax image data). Then, the processing at step 2804 and subsequent steps is repeated on the parallax image data newly acquired.

At step 2811, the image capturing unit control unit 108 performs control to exit image capturing (or recording of captured image data).

The above is the flow of processing in the image processing unit 112 according to the present embodiment. Due to this, even in the case where the optical parameters or the positional relationship between the image capturing apparatus and the subject of interest changes during the period of image capturing in the case of the captured image, such as a moving image, and accompanying this, the focused state of the subject of interest changes, it is possible for a user to grasp the fact in real time.

It may also be possible to perform processing to determine whether the subject of interest specified at step 2803 is included in the acquired parallax image at the time of newly acquiring the parallax image data at step 2810 and then to perform processing to notify a user of the fact that the subject of interest is not included.

In the following, a specific example of the case where conditions change during the period of image capturing is explained with reference to drawings.

FIGS. 29A and 29B and FIGS. 30A and 30B are diagrams each explaining a scene in which the focus control range on the object side changes. As in FIG. 12, the three kinds of subjects (subject A, subject B, subject C) exist in positions different from the image capturing apparatus and the subject A is in the nearest position from the image capturing apparatus and the subject C is in the farthest position from the image capturing apparatus. In FIGS. 29A and 29B and FIGS. 30A and 30B, $D_{refocus}$ indicates the object side focus control range, which is the image side focus control range $d_{refocus}$ derived at step 2806 represented by replacing the image side with the object side. Further, $D_{focus}$ indicates the focus position of the image capturing apparatus on the object side.

In FIG. 29A, both the subject A and the subject B are within the focus control range $D_{refocus}$ and the focus position $D_{focus}$ is in the position of the subject A. It is assumed that the subject B is specified in such conditions. In this case, the subject B is within the range of the focus control range $D_{refocus}$, and therefore, at step 2808 described previously, the fact that refocus can be performed is notified by the notification unit 2702. Then, in the case where image capturing in continued, new parallax image data is acquired (step 2810) and the processing at step 2801 and subsequent steps on the acquired parallax image data is continued.

FIG. 29B shows the way the focus position $D_{focus}$, which is one of the optical parameters of the image capturing apparatus, has changed in accordance with the movement of the subject A to the image capturing apparatus side and accompanying this, the focus control range $D_{refocus}$ has also changed. That is, the focus position $D_{focus}$ has changed in accordance with the subject A having come nearer to the image capturing apparatus, and accompanying this change, the focus control range $D_{refocus}$ has narrowed, and therefore, the focused state of the subject B, which was within the focus control range $D_{refocus}$ previously, has changed to a state of being outside the range.

FIG. 30A shows the way the focus control range $D_{refocus}$ has changed in accordance with the change in the focal length, which is one of the optical parameters of the image capturing apparatus. That is, because the focus control range $D_{refocus}$ has narrowed accompanying the change in the focal length, the focused state of the subject B, which was within the focus control range $D_{refocus}$ previously, has changed to a state of being outside the range.

FIG. 30B shows the way the focus control range $D_{refocus}$ has changed because the image capturing apparatus (a person capturing an image) has become more distant from all the subjects including the subject B, which is the subject of interest. That is, the focus position $D_{focus}$ has moved forward accompanying the change in the positional relationship between the image capturing apparatus and the subject and accompanying this, the focus control range $D_{refocus}$ has also moved forward, and therefore, the subject of interest B, which was within the range of the focus control range $D_{refocus}$ previously, has moves out of the range. At this time, the optical parameters of the image capturing apparatus have not changed and only the positional relationship between the image capturing apparatus and the subject of interest has changed.

Finally, an aspect of notification to a user in the case where the focused state of the subject of interest has changed as described above is explained. FIGS. 31A to 31E are diagrams each for explaining a variation of the aspect of notification to a user in the case where the focused state of the subject of interest has changed.

First, FIG. 31A is an example of the display screen generated at the time of specification of the subject B as a subject of interest (see FIG. 29A described previously) and displayed in the display unit 106. In this case, the subject B is within the range of the focus control range $D_{refocus}$, and therefore, the fact that refocus can be performed is notified by voice etc. In FIG. 31A, an overlay display of a message that "refocus can be performed" as explained in the first embodiment is not produced (see FIG. 13A described previously) and the single-viewpoint image is used as the display screen as it is.

FIGS. 31B to 31E each show an example of the aspect of notification to a user in the case where the subject B of interest has moved out of the focus control range as in FIGS. 29B and 29C described previously.

FIG. 31B is an aspect in which the change in the focused state of the subject of interest is notified to a user by producing an overlay display of a message that "refocus cannot be performed" indicative of that refocus cannot be performed on the screen.

FIG. 31C is an aspect in which the change in the focused state of the subject of interest is notified by voice. The contents of the voice may be a beep sound etc.

FIG. 31D is an aspect in which the change in the focused state of the subject of interest is notified by vibration.

FIG. 31E is an example of an aspect in which the change in the focused state of the subject of interest is notified by light (flash).

It may also be possible to make notification to a user by the methods described above through the period of image capturing or only in the case where the focused state of the subject of interest has changed. Further, it may also be possible to make notification through the period of image capturing after the focused state of the subject of interest has changed.

In the embodiment described hitherto, the case is explained as an example, where one subject is specified as a subject of interest, however, the number of subjects of interest that can be specified may be two or more. For example, in FIG. 29A, it may also be possible to enable specification of both the subject A and the subject B. In the case such as this, it is only required to design a configuration in which the focused state and the change therein are notified for both the subject A and the subject B. Further, at the time of notifying the change in the focused state, it is only required to make notification only for the subject of interest in which the change has occurred among a plurality of specified subjects of interest.

As explained above, according to the present embodiment, it is possible for a user to know at all times whether or not focus control can be performed on the specified subject of interest during the period of continuous image capturing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-004990, filed Jan. 15, 2013, and 2013-267102, filed Dec. 25, 2013, which are hereby incorporated by reference herein in their entirety.

What is claimed is:

1. An image processing apparatus comprising:
   one or more processors; and
   at least one memory storing instructions which, when executed by the one or more processors, cause the image processing apparatus to:
      specify, based on a first instruction from a user, a subject of interest within a parallax image obtained by performing image capturing from a plurality of different viewpoints;
      notify a user of a capability to refocus on the specified subject of interest in an image to be generated by performing image combination processing using the parallax image; and
      if a second subject of interest within a parallax image obtained by performing image capturing from a plurality of different viewpoints is specified based on a second instruction from the user after the subject of interest is specified by the user, simultaneously notify the user of a capability to refocus on the specified subject of interest and a capability to refocus on the second specified subject of interest in the image to be generated by performing image combination processing using the parallax image.

2. The image processing apparatus according to claim 1, wherein the at least one memory stores further instructions which, when executed by the one or more processors, cause the image processing apparatus to:
   generate a display image indicating the capability to refocus on the specified subject of interest in an image to be generated by performing image combination processing using parallax image; and
   notify the user of the capability to refocus by displaying the display image,
   wherein the display image is an image including a first image including an image of the subject of interest and is also an image indicating a capability to refocus on the subject of interest in a second image that is generated from the parallax image and differs from the first image.

3. The image processing apparatus according to claim 2, wherein the display image is an image in which a display indicating a capability to refocus on the subject of interest in the second image is superimposed on the first image.

4. The image processing apparatus according to claim 2, wherein the second image is generated by the image combination processing using the parallax image.

5. The image processing apparatus according to claim 2, wherein the at least one memory stores further instructions which, when executed by the one or more processors, cause the image processing apparatus to derive a focus control range in the image combination processing; and
   generate the display image based on the derived focus control range.

6. The image processing apparatus according to claim 5, wherein the at least one memory stores further instructions which, when executed by the one or more processors, cause the image processing apparatus to derive the focus control range in accordance with an angle of view of the parallax image.

7. The image processing apparatus according to claim 5, wherein the focus range derivation unit derives the focus control range in accordance with a resolution in the image generated by the image combination processing.

8. The image processing apparatus according to claim 5, further comprising a determination unit configured to determine a focused state of the subject of interest based on the derived focus control range,
   wherein the generation unit generates the display image based on a determination result of the determination unit.

9. The image processing apparatus according to claim 8, wherein the determination unit determines whether it is possible to generate an image focused on the subject of interest by the image combination processing, and
   the display image is an image indicating whether it is possible to generate an image focused on the subject of interest by the image combination processing.

10. The image processing apparatus according to claim 8, further comprising a distance derivation unit configured to derive a distance to the subject of interest, wherein the determination unit determines a focused state of the subject of interest based on the distance to the subject of interest derived by the distance derivation unit and the focus control range derived by the focus range derivation unit.

11. The image processing apparatus according to claim 10, wherein the parallax image is configured by a plurality of single-viewpoint images captured from each of the viewpoints, and
the distance derivation unit derives the distance to the subject of interest by performing stereo matching between the plurality of single-viewpoint images.

12. The image processing apparatus according to claim 2, wherein the parallax image is configured by a plurality of single-viewpoint images captured from each of the viewpoints, and
the first image is one of the plurality of single-viewpoint images.

13. The image processing apparatus according to claim 2, wherein the parallax image is configured by a plurality of single-viewpoint images captured from each of the viewpoints, and
the first image is a combined image obtained by combining the plurality of single-viewpoint images.

14. The image processing apparatus according to claim 1, wherein the specification unit derives a distance of a subject space using the parallax image and specifies the subject of interest based on the derived distance of the subject space.

15. The image processing apparatus according to claim 1, wherein the at least one memory stores further instructions which, when executed by the one or more processors, cause the image processing apparatus to notify the user of the capability to refocus by using sound.

16. The image processing apparatus according to claim 1, wherein the at least one memory stores further instructions which, when executed by the one or more processors, cause the image processing apparatus to notify the user of the capability to refocus by using vibration.

17. The image processing apparatus according to claim 1, wherein the at least one memory stores further instructions which, when executed by the one or more processors, cause the image processing apparatus to notify the user of the capability to refocus by using light.

18. The image processing apparatus according to claim 1, wherein the at least one memory stores further instructions which, when executed by the one or more processors, cause the image processing apparatus to notify the user of a change in the capability to refocus.

19. An image capturing apparatus comprising the image processing apparatus according to claim 2.

20. The image capturing apparatus according to claim 19, wherein the image capturing apparatus has a live view function, and the display image is an image displayed by the live view function.

21. An image processing method comprising the steps of:
specifying, based on a first instruction from a user, a first subject of interest within a parallax image obtained by performing image capturing from a plurality of different viewpoints;
notifying a user of a capability to refocus on the first specified subject of interest in an image generated by performing image combination processing using the parallax image;
specifying, based on a second instruction from the user, a second subject of interest within the parallax image obtained by performing image capturing from a plurality of different viewpoints after the first subject of interest is specified by the user;
simultaneously notifying the user of a capability to refocus on the first specified subject of interest and a capability to refocus on the second specified subject of interest in the image to be generated by performing image combination processing using the parallax image.

22. A non-transitory computer readable storage medium storing a program for causing a computer to perform the image processing method according to claim 21.

* * * * *